United States Patent
Satake et al.

(10) Patent No.: US 8,703,346 B2
(45) Date of Patent: Apr. 22, 2014

(54) ELECTROLYTE SHEET FOR SOLID OXIDE FUEL CELL, METHOD FOR PRODUCING THE SAME, AND CELL FOR SOLID OXIDE FUEL CELL

(75) Inventors: Takeshi Satake, Osaka (JP); Fumihide Tamura, Himeji (JP); Norikazu Aikawa, Himeji (JP); Kazuo Hata, Osaka (JP)

(73) Assignee: Nippon Shokubai Co., Ltd, Osaka-Shi (JP)

( * ) Notice: Subject to any disclaimer, the term of this patent is extended or adjusted under 35 U.S.C. 154(b) by 374 days.

(21) Appl. No.: 13/138,721

(22) PCT Filed: Mar. 25, 2010

(86) PCT No.: PCT/JP2010/055285
§ 371 (c)(1),
(2), (4) Date: Sep. 20, 2011

(87) PCT Pub. No.: WO2010/110395
PCT Pub. Date: Sep. 30, 2010

(65) Prior Publication Data
US 2012/0021304 A1      Jan. 26, 2012

(30) Foreign Application Priority Data

Mar. 25, 2009   (JP) ................. 2009-075183

(51) Int. Cl.
  *H01M 8/06*    (2006.01)
  *H01M 8/10*    (2006.01)
  *H01M 8/00*    (2006.01)

(52) U.S. Cl.
  USPC ............................. 429/408; 429/479; 429/535

(58) Field of Classification Search
  USPC .......................................... 429/408, 479, 535
  See application file for complete search history.

(56) References Cited

U.S. PATENT DOCUMENTS 5,480,737 A   1/1996  Satake et al.
5,501,914 A   3/1996  Satake et al.
(Continued)

FOREIGN PATENT DOCUMENTS

JP   01-227362   9/1989
JP   06-194616   7/1994
(Continued)

OTHER PUBLICATIONS

Notice of Reasons for Refusal for Japan Patent Application No. JP2010-070534, Nov. 30, 2010, Dispatch No. 860067, Japan.

(Continued)

*Primary Examiner* — Helen O Conley
(74) *Attorney, Agent, or Firm* — Masuvalley & Partners

(57) ABSTRACT

An electrolyte sheet for solid oxide fuel batteries with mechanical strength characteristics is proposed. These characteristics may include a high and stable average value of strength, Weibull coefficient, and a high adhesion to an electrode formed on a surface thereof and hence inhibits the electrode from interfacial separation from the electrolyte sheet. The electrolyte sheet for solid oxide fuel batteries is characterized by having a plurality of concaves and/or convexes on at least one surface thereof, the concaves and convexes having base faces which are circular or elliptic or are a rounded polygon in which the vertexes have a curved shape with a curvature radius of 0.1 μm or larger and/or the concaves and convexes having a three-dimensional shape which is semispherical or semiellipsoidal or is a polyhedron in which the vertexes and the edges have a curved cross-sectional shape having a curvature radius of 0.1 μm or larger.

20 Claims, 13 Drawing Sheets

(56) References Cited

U.S. PATENT DOCUMENTS

| | | |
|---|---|---|
| 7,531,261 B2 | 5/2009 | Badding et al. |
| 7,914,877 B2 | 3/2011 | Ohmori et al. |
| 7,927,755 B2 | 4/2011 | Ohmori et al. |
| 7,947,213 B2 | 5/2011 | Badding et al. |
| 2004/0265663 A1 | 12/2004 | Badding et al. |
| 2004/0265664 A1 | 12/2004 | Badding et al. |
| 2007/0248869 A1 | 10/2007 | Ohmori et al. |
| 2007/0273070 A1 | 11/2007 | Badding et al. |
| 2008/0050558 A1 | 2/2008 | Ohmori et al. |
| 2008/0096076 A1 | 4/2008 | Ohmori et al. |

FOREIGN PATENT DOCUMENTS

| | | |
|---|---|---|
| JP | 07-073887 | 3/1995 |
| JP | 07-142071 | 6/1995 |
| JP | 07-245113 | 9/1995 |
| JP | 08-195206 | 7/1996 |
| JP | 09-055215 | 2/1997 |
| JP | 09-278517 | 10/1997 |
| JP | 11-079852 | 3/1999 |
| JP | 2002-042831 | 2/2002 |
| JP | 2007-519176 A | 7/2007 |
| JP | 2007-217741 | 8/2007 |
| JP | 2007-313650 | 12/2007 |
| JP | 2008-050222 | 3/2008 |
| JP | 2008-135353 | 6/2008 |

OTHER PUBLICATIONS

Chinese Office Action in CN Patent Application No. 201080011340.4, dispatched on Jun. 5, 2013, Examiner of SIPO.

(a)

(b)

ELECTROLYTE SHEET FOR SOLID OXIDE FUEL CELL, METHOD FOR PRODUCING THE SAME, AND CELL FOR SOLID OXIDE FUEL CELL

This application is a national phase application under 35 U.S.C. §371 of International Application Serial No. PCT/JP2010/055285, filed on Mar. 25, 2010, and claims the priority benefit under 35 U.S.C. §119 of Japanese Patent Application No. 2009-075183, filed on Mar. 25, 2009, which are hereby expressly incorporated by reference in their entirety for all purposes.

TECHNICAL FIELD

The present invention relates to an electrolyte sheet for solid oxide fuel cell and a method for producing the same as well as a stamper optimally used for manufacturing the electrolyte sheet and a cell for solid oxide fuel cell, in which the electrolyte sheet is used.

BACKGROUND OF THE INVENTION

Ceramics have been used in many fields since they have outstanding electric and magnetic characteristics in addition to their mechanical properties, such as, for example, heat resistance and abrasion resistance. Ceramics based on zirconia that have outstanding oxygen ion conductivity, heat resistance, corrosion resistance, toughness and chemical stability are used for solid electrolyte membranes of oxygen sensors and humidity sensor, as well as electrolyte sheets of solid oxide fuel cells.

To achieve a better performance of the electrolyte sheets for solid oxide fuel cells, it is desired to increase an effective area of cell reaction and to prevent gradual interface delamination of an electrode layer from the electrolyte sheet. For this purpose, a method of roughening a surface of an electrolyte sheet by blasting or etching has been proposed (Patent document 1). There have also been attempts to provide moderate roughness on the surface of the electrolyte sheets. Such attempts may include a method of roughening a green sheet, achieved by pressing a metallic mesh on the surface of the green sheet, which is a precursor of an electrolyte sheet, followed by firing the green sheet (Patent document 2); the method of roughening the green sheet may also achieved by sandwiching the green sheet with a roughening sheet, pressing and transferring the roughened surface of the roughening sheets to the green sheet, followed by firing the green sheet (Patent documents 3); and further, the method of roughening the green sheet may be achieved by casting a slurry containing an electrolyte material onto a roughened polymer film, followed by firing the green sheet (Patent documents 4). Furthermore, although its purpose is not for roughening the electrolyte sheet, but for increasing the effective area of the electrode by enhancing the surface area of the electrolyte sheet, a method has been disclosed in which dimples are formed on both sides of the electrolyte green sheet by a press die, followed by firing (Patent documents 5).

Though not related to the technology about the method of manufacturing the electrolyte sheet, there has also been a proposed method for manufacturing a setter used for firing. This method involves forming recessions or protrusions on a surface of a molded body by press molding using a tape or sheet, on which micro grains are adhered, or a resin sheet, whose surface is caved in by machining, followed by firing the molded body (Patent document 6); Further, the method of manufacturing the firing setter may involve press-forming the firing setter, using a metallic punch mold whose surface is formed to be uneven by machining, followed by firing the firing setter (Patent document 7).

The following is a list of cited prior arts and patent documents:
Patent Document 1: Japan Patent Application Publication H1-227362
Patent Document 2: Japan Patent Application Publication H9-55215
Patent Document 3: Japan Patent Application Publication 2007-313650
Patent Document 4: Japan Patent Application Publication 2002-42831
Patent Document 5: Japan Patent Application Publication H7-73887
Patent Document 6: Japan Patent Application Publication H9-278517
Patent Document 7: Japan Patent Application Publication H11-79852

SUMMARY OF THE INVENTION

Problem to be Solved by the Invention

In the method of treating the surface of the electrolyte sheet by blasting or etching, the surface of the treated sheet has an uneven degree of roughness. Such sheet can be easily cracked from the bottom of the recessed portion of the roughened surface. Further, in a very thin electrolyte sheet with a thickness of less than 0.5 mm, and especially below 0.3 mm, stresses tend to be incurred to the electrolyte sheet by such a process or treatment. As a result, warps and swells are formed on the electrolyte sheet and the strength of the electrolyte sheet is lowered. Furthermore, in the method of blasting, it is difficult to control the surface roughening of the electrolyte sheet, and therefore, operability and workability are burdensome.

In the conventional methods of roughening a green sheet prior to firing, although the problem of adjusting the surface roughening of the electrolyte sheet or the problem of the workability are reduced, electrolyte sheets treated by such methods can still easily crack from the bottom of the recessed portion of the surface. There is a concern that electrolyte sheets whose strengths are unsatisfactory are mixed when electrolyte sheets are mass-produced. In such a case, reliability of the solid oxide fuel cell system can be diminished because fractures of the electrolyte sheet can be formed from its cracks when electrodes are formed on the surface of the electrolyte sheet by screen printing, or when cells are stacked.

In a case where the electrolyte sheet is provided with many dimples on its both sides, although the recessed portion of the dimple is formed in almost semicircular cave-ins without sharp corners, the depth of the recessed portion is as deep as about 1 mm if such a depth is extrapolated from the pitch between the dimples. For this reason, the heights of the top projected portions of the dimples do not always become even. This results in a problem of sealability.

In the method of employing a tape or sheet on which micro grains are adhered, it is difficult to distribute uniformly the micro grains when the micro grains are adhered to the tape or sheet. For this reason, if this method is applied for roughening the electrolyte green sheet, it may cause a formation of micro grain aggregates, which risks formations of cave-ins much larger than the desired diameter. Moreover, since the dispersion of the micro grains is not uniform, an electrolyte sheet with uniformly roughened surface cannot be obtained. In the method of using a metallic punch mold whose surface is processed to be roughened, it is advantageous to form cave-ins and projections uniformly. However, to achieve the surface roughness required for the electrolyte sheet, the average circle-equivalent diameter of the projections formed on the punch mold must be extremely small so as to be less than 250 µm. However, it is difficult to form such small projections on the punch mold by machining. Even if such small projections were formed, it would not be possible to make the projections have smooth three-dimensional shapes without corners like a hemispherical shape.

The green sheets whose surfaces are roughened by the above conventional methods have many cave-ins and projections on their entire surfaces. If the roughness is observed from the roughness curve determined by a surface roughness shape measurement device, most of both the caved-in portions (defined as valley in JIS B0601) and projected portions (defined as mountain in JIS B0601) have acutely angled shapes. Even in the electrolyte sheets obtained by firing, the caved-in portions are still acutely angled while the projected portions, particularly summits of the projections (defined as summit in JIS B0601) have mostly obtusely angled or flat shapes when the roughness is observed from the roughness curve as described before. This is because, when the plural green sheets are fired, being stacked by one another with insertions of spacers between the green sheets, a large number of projections on the surface of the green sheets come in direct contact with the spacers and the summits of the projections become rounded, resulting in the obtusely angled or flat shape. On the other hand, a large number of the cave-ins, particularly bottoms of the cave-ins (defined as valley bottom in JIS B0601) on the surface of the green sheet do not directly contact with the spacers. Since the roughened shapes are maintained even after firing, most of them are remained to be acutely angled. These bottoms of the cave-ins are prone to concentration of stresses caused by the sinter of ceramic particles during firing. Since their shapes are acutely angled, it is surmised that these acutely angled bottoms are the roots of cracks. Therefore, the acutely angled bottoms are thought to be the cause of fracture due to an external minute force or impact. Thus, such bottoms are considered to be the cause of the decrease of the strength or the decrease of the Weibull modulus of the electrolyte sheet.

The present invention is proposed in view of the above aforementioned problems and is achieved by focusing on the cause of the cracks formed at the cave-ins on the roughened surface of the electrolyte sheet. The present invention provides an electrolyte sheet that has a large average value of strength and a large Weibull modulus and thus has steady mechanical strength. The present invention also provides an electrolyte sheet in which interfacial delamination of electrodes from the electrolyte sheet is suppressed by improved adhesion between the electrodes and the electrolyte sheet. The present invention further provides a method of efficiently manufacturing such durable high-performance electrolyte sheets. The present invention also provides a stamper, which is optimally used for this manufacturing. Furthermore, the present invention provides a cell for solid oxide fuel cell, which can maintain its power generation performance over a long period of time, utilizing such a durable high-performance electrolyte sheet.

Means to Solve the Problem

As a result of extensive research to solve the above-mentioned problems, the inventors of the present invention discovered that by making concaves or convexes formed on the electrolyte sheet with a certain shape and size, the electrolyte sheet becomes mechanically stronger showing excellent adhesion and bondability to electrodes while preventing cracks from being generated. The present invention was completed by such inventors' discovery.

In accordance with one aspect of the present invention, there is provided an electrolyte sheet for solid oxide fuel cell that has plural concaves and/or convexes, formed at least on one side of the electrolyte sheet. Shapes of the basal planes (plan-viewed shapes) of the concaves or the convexes may be circular, elliptical, or polygonal with their corners rounded so that the corners have a curvature radius of 0.1 µm or more. Other embodiments may have three-dimensional shapes of the concaves or the convexes. Examples of these three-dimensional shapes may include hemispherical, hemi-ellipsoidal, or polyhedral with their corners or ridges having curves of a curvature radius of 0.1 µm or more in the cross-sectional view. The basal planes of the concaves or the convexes have an average circle-equivalent diameter between 0.5 µm and 250 µm. The concaves or the convexes have an average depth or height between 0.3 µm and 50 µm. The average thickness of the electrolyte sheet is from 100 µm to 400 µm. By setting the size and shape of the concaves or convexes in the above ranges, the electrolyte sheet becomes superior in adhesion to electrodes and also superior in mechanical strength.

The average depth of the concaves or the average height of the convexes on one side of the electrolyte sheet is preferably between 1 and 33 if the thickness of the sheet is defined as 100. If the average depth of the concave or the average height of the convex is within such a range, the strength of the electrolyte sheet is further enhanced.

The electrolyte sheet preferably contains at least one element selected from the group consisting of: zirconium, cerium, lanthanum, and gallium. A coefficient of variance of the depths of the concaves (standard deviation of depths/average depth) and a coefficient of variance of the heights of the convexes (standard deviation of heights/average height) are preferably at most 0.25. A coefficient of variance of the circle-equivalent diameters of the basal planes of the concaves or convexes (standard deviation of circle-equivalent diameters/average circle-equivalent diameter) is preferably at most 0.25. A ratio of the average depth of the concaves to the average circle-equivalent diameter of the concaves (average depth/average circle-equivalent diameter) or a ratio of the average height of the convexes to an average circle-equivalent diameter of the convexes (average height/average circle-equivalent diameter) is preferably between 0.05 and 0.5.

In accordance with a second aspect of the present invention, there is provided a method of producing an electrolyte sheet for solid oxide fuel cell related to the first embodiment of the present invention. The method includes a step of pressing a stamper on one side or both sides of an electrolyte green sheet. The stamper has plural convexes and/or concaves. Shapes of the basal planes of the convexes or the concaves may be circular, elliptical, or polygonal with their corners rounded so that the corners have an at least 0.1 µm of curvature radius. Other embodiments may include three-dimensional shapes of the convexes or the concaves. Example of these three-dimensional shapes may include hemispherical, hemi-ellipsoidal, or polyhedral with their corners or ridges having a curve of an at least 0.1 µm of curvature radius in cross-sectional view. The convexes or the concaves have circle-equivalent diameters between 0.8 µm and 380 µm. The convexes or the concaves have heights or depths between 1.1 µm and 186 µm. By pressing the electrolyte green sheet with the stamper having such convexes or concaves, the concaves or convexes having a desired size and shape are surely formed on the surface of the electrolyte sheet. In addition, by arranging the convexes or the concaves in an orderly manner on the stamper, the concaves or convexes are uniformly formed on the surface of the electrolyte sheet.

A maximum stress of the electrolyte green sheet at a temperature of pressing the stamper is preferably between 1.96 MPa and 19.6 MPa. An elongation at maximum stress is preferably between 20% and 500%. A slurry for forming the electrolyte green sheet preferably contains at least a substance selected from the group consisting of zirconia, ceria, and lanthanum gallate oxide as an electrolyte material. The slurry for forming the electrolyte green sheet preferably contains 12 to 30 mass parts of an organic binder for 100 mass parts of the electrolyte material.

In accordance with a third aspect of the present invention, there is provided a stamper for making concaves and/or convexes on an electrolyte green sheet. The stamper has plural convexes and/or concaves formed at least on one side. Shapes of the basal plane of the convexes or the concaves may include circular, elliptical, or polygonal with their corners rounded so that the corners have an at least 0.1 µm of curvature radius. Other embodiments may include three-dimensional shapes of the convexes or the concaves. Example of these three-dimensional shapes may include hemispherical, hemi-ellipsoidal, or polyhedral with their corners or ridges having a curve of an at least 0.1 µm of curvature radius in a cross-sectional view. Preferably, the convexes or the concaves have circle-equivalent diameters between 0.8 µm and 380 µm. The convexes or the concaves have heights or depths between 1.1 µm and 186 µm.

In accordance with a fourth aspect of the present invention, there is provided a cell for solid oxide fuel cell. The cell contains the electrolyte sheet according to the first embodiment of the present invention. In this embodiment, the cell for solid oxide fuel cell contains an electrolyte sheet having concaves. A fuel electrode and/or an air electrode are directly formed on the electrolyte sheet. The fuel electrode or the air electrode preferably contains electrode particles, whose average particle diameter is at most 1/10 of the average circle-equivalent diameter of the concaves. Thereby, plural electrode particles can be provided in one concave formed on the electrolyte sheet. This increases contact points between the electrolyte sheet and the electrode particles. Therefore, power density of the fuel cell is improved.

Effect of the Invention

The present invention provides an electrolyte sheet for a solid oxide fuel cell that has improved and more stable mechanical properties. Examples of such improved properties may include a large average value of strength and a large Weibull modulus as well as a preventive property of interfacial delamination of electrodes from the electrolyte sheet. Further, by utilizing such an electrolyte sheet, it becomes possible to provide a cell for solid oxide fuel cell that maintains a prolonged and efficient power generation that are resistant to crack even after being integrated in a fuel cell system.

DETAILED DESCRIPTION OF THE INVENTION

Figure 1:
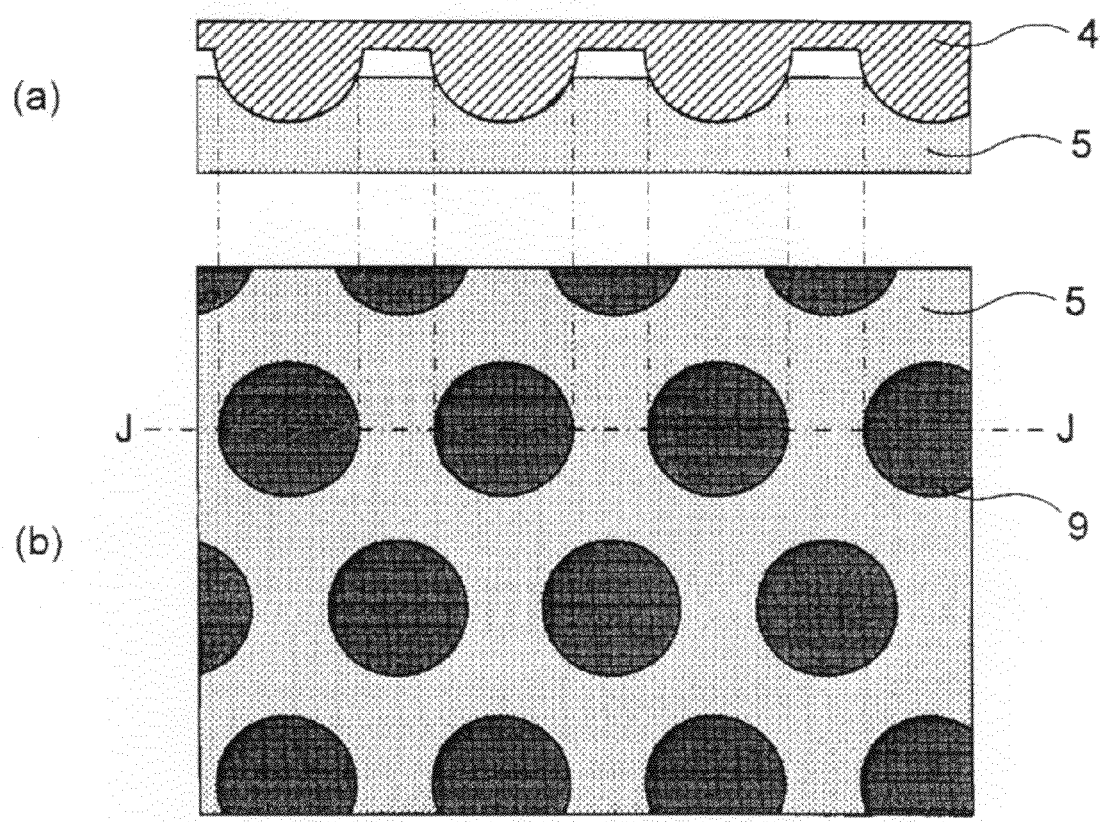
FIG. 1 is a schematic diagram showing a state in which a stamper is pressed onto an electrolyte green sheet. (a) is a cross-sectional view of J-J line in (b). (b) is a plan view of the electrolyte green sheet (stamper not shown).

Embodiments of the present invention will be explained in detail below. However, the present invention is not limited to the description below unless it is within the scope of the invention. In the following, an electrolyte sheet according to the first embodiment of the present invention, which can be used for solid oxide fuel cell, will be explained in detail.

1-1. Physical Properties of the Electrolyte Sheet

The electrolyte sheet for solid oxide fuel cell (hereafter, may also be referred just as 'electrolyte sheet') of the present invention is characterized by having plural concaves and/or convexes on at least one side of it. As described previously, the shape of the basal plane (plan-viewed shape) of the concave or the convex is circular, elliptical or polygonal with its corners rounded so that the corners have a curvature radius of 0.1 µm or more. Or, the three-dimensional shape of the concave or the convex is hemispherical, hemi-ellipsoidal or polyhedral with its corners or ridges having curves of a curvature radius of 0.1 µm or more in the cross-sectional view. The basal planes of the concaves or the convexes have an average circle-equivalent diameter between 0.5 µm and 250 µm. The concaves or the convexes have an average depth or an average height between 0.3 µm and 50 µm. The average thickness of the electrolyte sheet is from 100 µm to 400 µm. By setting the size and shape of the concaves or convexes in the above ranges, the electrolyte sheet becomes superior in adhesion to electrodes and superior in mechanical strength.

The shape of the basal plane of the concave or the convex has a circular shape, an elliptical shape or a corner-rounded polygonal shape with the rounded corners having a curvature radius of 0.1 µm or more. Here, the circular shape and the elliptical shape also include an approximate circular shape and an approximate elliptical shape. The term 'polygonal shape with its corners rounded and with the rounded corners having a curvature radius of 0.1 μm or more' refers to a convex polygon or a concave polygon as a basic shape, and the corners of the polygon are curved so as to be defined by a curvature radius of 0.1 μm or more. When such a polygon is employed, it is preferable that all the corners of the polygon have curved shapes having a curvature radius of 0.1 μm or more. By making the shape of the basal plane edgeless, occurrence of cracks in the electrolyte sheet is effectively suppressed. The shape of the basal plane is preferably circular or elliptical, and more preferably circular. Here, the shape of the basal plane (plan-viewed shape of the concave or convex) is defined as a shape of the outermost contour of the concave or convex (boundary between the concave or the convex and a baseline). The outermost contour can be confirmed by laser microscope. The baseline can be regarded as for example, the highest position of the impression of the stamper when the concave is formed by the stamper, which is described later. The baseline can also be regarded as for example, the lowest position of the impression of the stamper when the convex is formed by the stamper.

Figure 2:
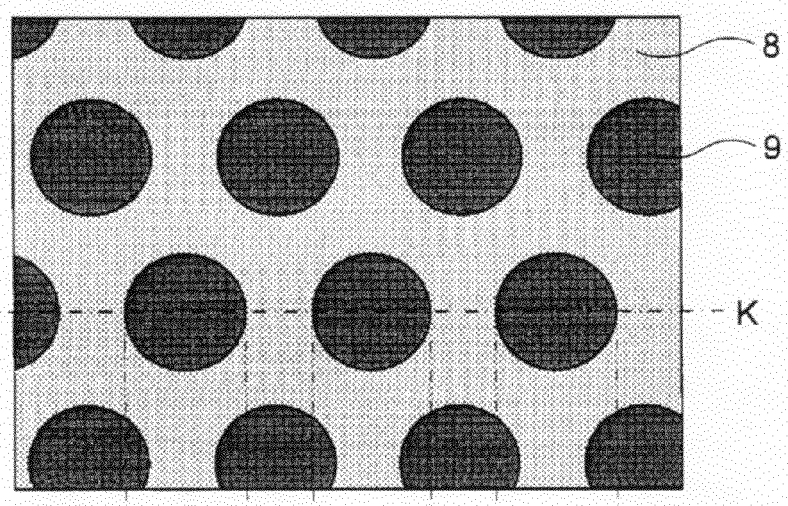
FIG. 2 is a schematic diagram explaining how to determine a baseline. (a) is a plan view of an electrolyte green sheet. (b) is a concave profile of when the dashed line K in (a) is scanned.
Figure 2:
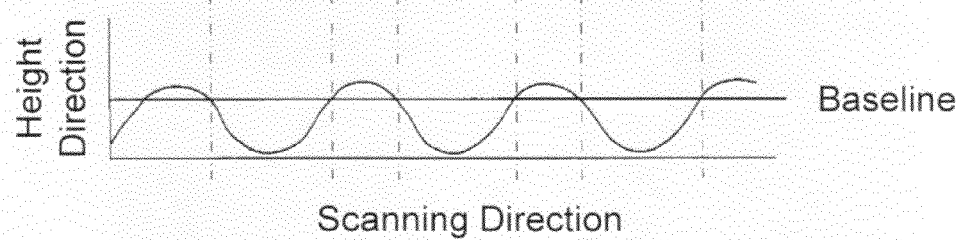

Referring first to FIGS. 1 & 2, an example of baseline is explained in a case where the concaves are formed on the electrolyte green sheet by a stamper having convexes. FIG. 1 is a schematic diagram showing a situation where an electrolyte green sheet is pressed by a stamper. FIG. 1 (a) is a cross-sectional view of J-J line shown in FIG. 1 (b). FIG. 1 (b) is a plan view of the electrolyte green sheet (stamper not shown). FIG. 2 is a schematic diagram explaining a method of how to determine the baseline. FIG. 2 (a) is a plan view of an electrolyte sheet. FIG. 2 (b) is a concave shape profile when the dashed line K in FIG. 2 (a) is scanned.

As shown in FIG. 1, when a stamper 4 is pressed onto an electrolyte green sheet 5, impressions 9 are formed and remained in the places where the stamper 4 is in contact with the electrolyte green sheet 5. These impressions 9 still remain in the electrolyte sheet 8, which is formed by firing the electrolyte green sheet 5. The impressions 9 can be easily confirmed by laser microscope. Therefore, by observing the electrolyte sheet 8 and checking the impressions 9 with the laser microscope (FIG. 2(a)), and by comparing the electrolyte sheet 8 with a concave shape profile obtained by the laser microscope (FIG. 2(b)), the baseline can be determined.

Three-dimensional shape of the concave or the convex is hemispherical, hemi-ellipsoidal, or polyhedral with its corners or ridges having a curve, which has a curvature radius of 0.1 μm or more in the cross-sectional view. Here, the hemispherical and hemi-ellipsoidal shapes include an approximately hemispherical shape and an approximately hemi-ellipsoidal shape. The term 'polyhedral shape with its corners or ridges having a curve of a curvature radius of 0.1 μm or more in the cross-sectional view' refers to a polyhedron such as cylinder, cone, truncated cone, prism, pyramid, truncated pyramid, or combinations thereof as a basic shape, and the cross-sectional shape of the corner portion or the ridge portion of the polyhedron has a curved shape defined by a curvature radius of 0.1 μm or more. Moreover, when such a polyhedron is employed, it is preferable that all the corners or ridges of the polyhedron have curved shapes of a curvature radius of 0.1 μm or more. By forming the three-dimensional shape of the concave or the convex into a shape without corners, occurrence of cracks in the electrolyte sheet is reduced. The three-dimensional shape of the concave or the convex is preferably hemispherical or hemi-ellipsoidal, and more preferably hemispherical.

The average circle-equivalent diameter of the shapes of the basal planes of the concaves or the convexes is 0.5 μm or more, preferably 5 μm or more, and more preferably 15 μm or more. Furthermore, the average circle-equivalent diameter of the basal planes of the concaves or the convexes is 250 μm or less, preferably 200 μm or less, and more preferably 150 μm or less. If the average circle-equivalent diameter is less than 0.5 μm, the adhesion of the electrolyte sheet to an electrode becomes inferior, and delamination of the electrode can occur in a long-term use. On the other hand, if the average circle-equivalent diameter exceeds 250 μm, the strength of the electrolyte sheet declines much more than that of an electrolyte sheet without concaves or convexes. In the present invention, the average circle-equivalent diameter is referred as following: A region of 5 μm-2 mm×5 μm-2 mm square in the electrolyte sheet is selected (this region includes at least the center of the electrolyte sheet, and this region also includes at least 50 concaves or convexes). All the areas of the basal planes of the concaves or convexes in this region are measured. And, the average area of the basal planes of the concaves or the convexes is calculated. In the end, the average circle-equivalent diameter is calculated from this average area.

The coefficient of variance of the circle-equivalent diameters of the basal planes of the concaves or convexes (standard deviation of circle-equivalent diameters/average circle-equivalent diameter) is preferably 0.25 or less, more preferably 0.20 or less, and most preferably 0.15 or less. If the coefficient of variance is within such a range, the average strength and Weibull modulus of the electrolyte sheet can be enhanced. Further, interfacial delamination of electrode from the electrolyte sheet is well prevented. The lower limit of the coefficient of variance is 0. The standard deviation of the circle-equivalent diameters can be determined with the following formula:

$$\sigma = \sqrt{\frac{1}{(n-1)} \times \left\{ \sum_{i=1}^{n} (x_i - x_{ave})^2 \right\}}$$

In this formula, σ is the standard deviation, $x_i$ is a circle-equivalent diameter of each of the basal planes of the concaves or the convexes, $x_{ave}$ is the average circle-equivalent diameter, and n is the number of concaves or convexes measured.

The average depth of the concaves is 0.3 μm or more, preferably 1.0 μm or more, and more preferably 3 μm or more. And, the average depth of the concaves is 50 μm or less, preferably 40 μm or less, and more preferably 30 μm or less. If the average depth of the concaves is less than 0.3 μm, the adhesion of the electrolyte sheet to an electrode becomes inferior, and delamination of the electrode can occur in a long-term use. On the other hand, if the average depth of the concaves exceeds 50 μm, the strength of the electrolyte sheet declines much more than that of an electrolyte sheet without concaves or convexes. In the present invention, the average depth of the concaves is referred to as the following: A region of 5 μm-2 mm×5 μm-2 mm square in the electrolyte sheet is selected (this region includes at least the center of the electrolyte sheet, and this region also includes at least 50 concaves). All the depths of the concaves in the region are measured. And, the average depth is calculated from these depths. Here, the depth of the concave is a distance from the baseline to the lowest point in the concave.

If the thickness of the sheet is defined as 100, the average depth of the concaves on one side of the sheet is preferably 1 or more, more preferably 2 or more, and most preferably 3 or more. Further, such average depth of the concaves is preferably 33 or less, more preferably 25 or less, and most preferably 20 or less. By making the ratio of the average depth of the concaves to the thickness of the sheet within such a range, the average strength and Weibull modulus of the electrolyte sheet can be enhanced. Further, interfacial delamination of electrode from the electrolyte sheet is well prevented.

The average height of the convexes is 0.3 µm or more, preferably 1 µm or more, and more preferably 3 µm or more. And, the average height of the convexes is 50 µm or less, preferably 40 µm or less, and more preferably 30 µm or less. If the average height of the convexes is less than 0.3 µm, the adhesion of the electrolyte sheet to an electrode becomes inferior, and delamination of the electrode can occur in a long-term use. On the other hand, if the average height of the convexes exceeds 50 µm, the strength of the electrolyte sheet declines much more than that of an electrolyte sheet without concaves or convexes. In the present invention, the average height of the convexes is referred to as the following: A region of 5 µm-2 mm×5 µm-2 mm square in the electrolyte sheet is selected (this region includes at least the center of the electrolyte sheet, and this region also includes at least 50 convexes). All the heights of the convexes in the region are measured. And, the average height is calculated from these heights. Here, the height of the convex is a distance from the baseline to the highest point in the convex.

If the thickness of the sheet is defined as 100, the average height of the convexes on one side of the sheet is preferably 1 or more, more preferably 2 or more, and most preferably 3 or more. Further, such average height of the convexes is preferably 33 or less, more preferably 25 or less, and most preferably 20 or less. By making the ratio of the average height of the convexes to the thickness of the sheet within such a range, the average strength and Weibull modulus of the electrolyte sheet can be enhanced. Further, interfacial delamination of electrode from the electrolyte sheet is well prevented.

The coefficient of variance of the depths of the concaves (standard deviation of depth/average depth) or the coefficient of variance of the heights of the convexes (standard deviation of height/average height) is preferably 0.25 or less, more preferably 0.20 or less, and most preferably 0.15 or less. If the coefficient of variance is within such a range, the average strength and Weibull modulus of the electrolyte sheet can be enhanced. Further, interfacial delamination of electrode from the electrolyte sheet is well prevented. The lower limit of the coefficient of variance is 0. The standard deviation of the depths of the concaves and the standard deviation of the heights of the convexes can be calculated with a similar way of calculating the standard deviation of the circle-equivalent diameters described before.

The ratio of the average depth to the average circle-equivalent diameter of the concaves (average depth/average circle-equivalent diameter) or the ratio of the average height to the average circle-equivalent diameter of the convexes (average height/average circle-equivalent diameter) are preferably 0.05 or more, more preferably 0.10 or more, and most preferably 0.15 or more. And, the ratio of the average depth to the average circle-equivalent diameter of the concaves or the ratio of the average height to the average circle-equivalent diameter of the convexes are preferably 0.5 or less, more preferably 0.45 or less, and most preferably 0.40 or less. If the ratio is within such a range, the average strength and Weibull modulus of the electrolyte sheet can be enhanced. Further, interfacial delamination of electrode from the electrolyte sheet is well prevented.

A gap between the lowest points of the concaves (the gap between the lowest points of two adjacent concaves) or a gap between the highest points of the convexes (the gap between the highest points of two adjacent convexes) may be uniform or not. However, being uniform is preferred. It is preferable that each concave or convex does not overlap to each other. Taking an account of the average circle-equivalent diameter of the concaves or the convexes, the difference between the gap and the average circle-equivalent diameter of the concaves or the convexes (gap—average circle-equivalent diameter) is preferably 0.1 µm or more, more preferably 0.5 µm or more, and most preferably 1 µm or more. And, the difference between the gap and the average circle-equivalent diameter of the concaves or the convexes is preferably 30 µm or less, more preferably 20 µm or less, and most preferably 10 µm or less.

The concaves or convexes may be disposed on the surface of the electrolyte sheet either regularly or irregularly. To make the surface roughness of the electrolyte sheet more uniform, it is preferable that the concaves or the convexes are disposed regularly. In this case, patterns of the disposed concaves and convexes include, for example, a lattice pattern and a houndstooth (zigzag) pattern.

The average thickness of the electrolyte sheet is 100 µm or more, preferably 120 µm or more, and more preferably 140 µm or more. And, the average thickness of the electrolyte sheet is 400 µm or less, preferably 300 µm or less, and more preferably 200 µm or less. If the average thickness of the electrolyte sheet is less than 100 µm, the mechanical strength of the electrolyte sheet becomes weaker, handling of the electrolyte sheet becomes harder, and a fracture of the electrolyte sheet can easily occur during the formation of the cell. On the other hand, if the average thickness of the electrolyte sheet exceeds 400 µm, the ion conductivity of the electrolyte sheet declines, and the power generation efficiency is declined after the formation of the cell. The thickness of the electrolyte sheet in the present invention is defined as a distance between a baseline of a frontside surface and a baseline of a backside surface.

Embodiments of disposing concaves and convexes on the electrolyte sheet may include: an embodiment of having plural concaves on one side; an embodiment of having plural convexes on one side; an embodiment of having plural concaves and convexes on one side; an embodiment of having plural concaves on both sides; an embodiment of having plural convexes on both sides; and an embodiment of having plural concaves and convexes on both sides. Among these, embodiments having plural concaves on one side or both sides of the electrolyte sheet are preferable. And, the embodiment having plural concaves on both sides of the electrolyte sheet is more preferable.

When the concaves are formed on the electrolyte sheet, an average distance between peaks, determined by a roughness curve obtained with an optical and laser-based non-contact three-dimensional profile measuring system, is preferably 0.1 µm to 30 µm. Also, an average valley depth is preferably 0.05 µm to 20 µm. The tips of the concaves in the roughness curve are preferably not acutely angled.

By forming plural concaves on a surface of an electrolyte sheet and making the shapes of the concaves and the shapes of the tips (bottoms) of the concaves a specific shape, it is possible to provide an electrolyte sheet having a proper surface roughness that helps not only prevent cracks due to the concentration of stresses to the tips of the concaves, but also enhance an electrode area and prevent interfacial delamination of electrode.

In the present invention, the shape of the tip of the concave on the electrolyte sheet can be identified using a roughness curve defined in JIS B 0601:2001 by measuring the surface of the electrolyte sheet with an optical and laser-based non-contact three-dimensional profile measuring system. Moreover, the device for measuring the roughness curve in the present invention is an optical and laser-based non-contact three-dimensional profile measuring system (manufactured by UBM Co. Ltd., product name: Microfocus Expert, Model no.: UBC-14 System). The measuring method is referred as following: From a 780 nm semiconductor laser light source through a movable objective lens, 1 µm of a focus in diameter is produced on the surface of the electrolyte sheet. The regular reflection light returns to the same optical path and forms uniform images on four photodiodes through a beam splitter. A heterogeneity of images is produced due to a displacement of the uneven surface of the electrolyte sheet at the spot being measured. Immediately a signal to correct the displacement is generated and transmitted so that the objective lens makes the laser light accurately focused on the surface of the electrolyte sheet. By detecting the amount of the movement of the objective lens by a light barrier measurement mechanism, an extremely precise measurement is performed. The specifications of the device include a 1 µm of spot diameter and a 0.01 µm of vertical resolution. A line profile analysis can be performed with a 0.1 mm of pitch.

The distance between the peaks refers to the distance between the two adjacent tips (tops) of the convexes determined by the roughness curve. The depth of the valley bottom refers to a distance to the concave tip from a point of intersection of a line connecting two adjacent convex tips (peaks) and a normal line passing the concave tip (valley bottom). When specifying the shape of the tip of the concaves, one that satisfies the distance between the peaks to be 0.1 µm to 30 µm and the depth of the valley bottom to be 0.05 µm to 20 µm is regarded as a concave.

In the present invention, the roughness curve of the electrolyte sheet is measured at nine locations in the electrolyte sheet at a scan length of 4 mm, using the optical and laser-based non-contact three-dimensional profile measuring system. All the distances between the peaks and all the valley depths are measured on the concaves, which are recognized to be so based on the nine roughness curves obtained. Then, their average values are calculated, resulting in the average distance between the peaks and the average valley depth.

Locations of the measurement by the optical and laser-based non-contact three-dimensional profile measuring system are total nine locations. One of the locations is a center of gravity of the electrolyte sheet. Further, the electrolyte sheet is divided into eight by one straight line passing the center of gravity and three straight lines passing the center of gravity and making angles of 45°, 90°, 135° with the straight line. Each one of the other eight locations is positioned in each of the divided eight regions. Although the locations of the measurement can be changed suitably according to the size and shape of the electrolyte sheet, edges of the electrolyte sheet should be avoided as the examples of the rectangular shape and the circular shape explained later.

Figure 3:
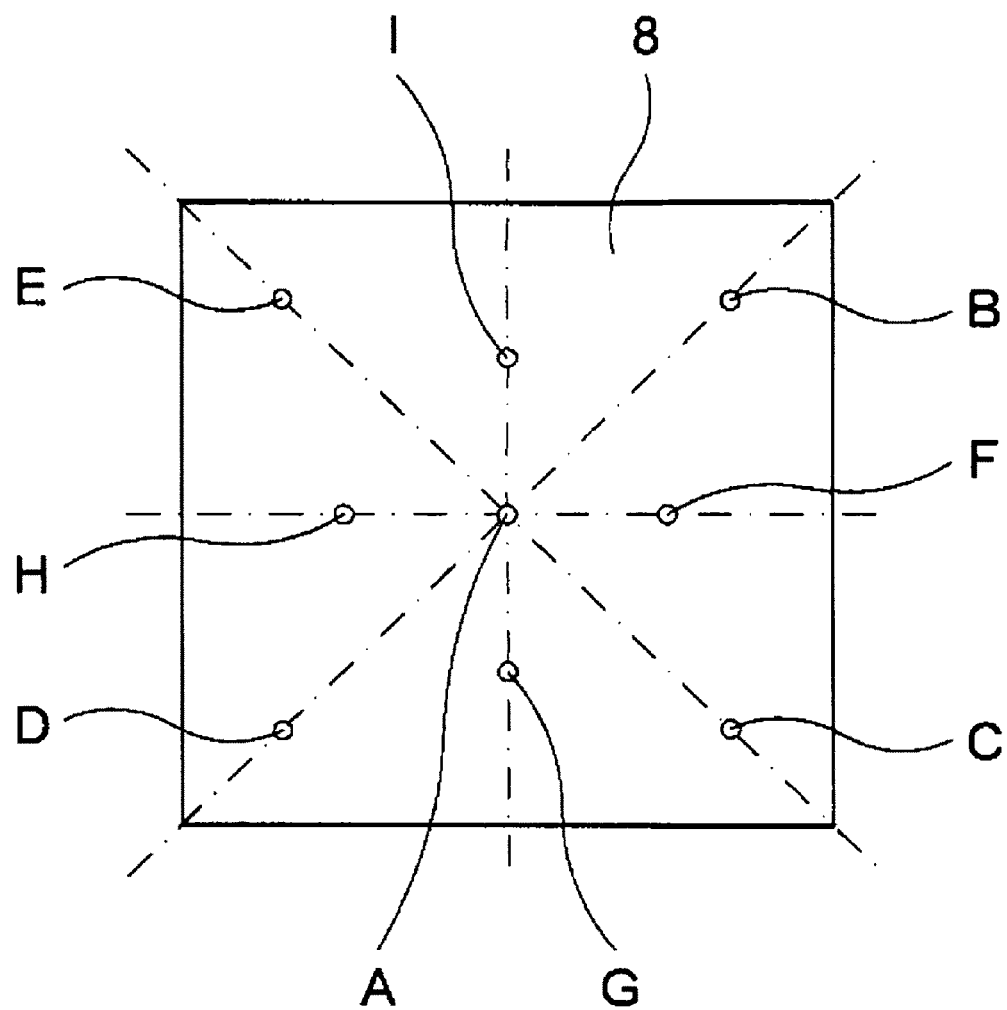
FIG. 3 is a schematic plan view showing the measuring locations of an optical and laser-based non-contact three-dimensional profile measuring system in a rectangular electrolyte sheet.
Figure 4:
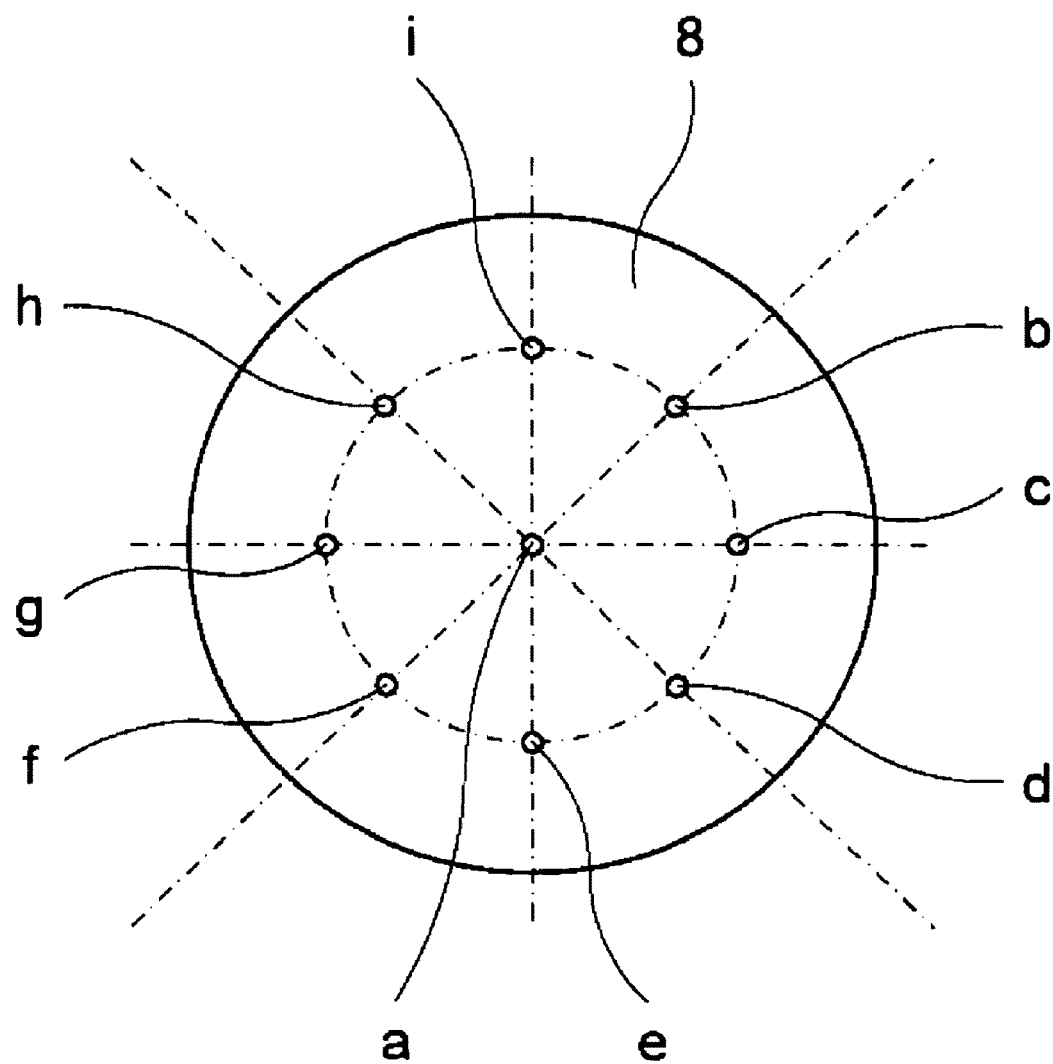
FIG. 4 is a schematic plan view showing the measuring locations of an optical and laser-based non-contact three-dimensional profile measuring system in a circular electrolyte sheet.

Referring next to FIGS. 3 & 4, the locations of the measurement in the case where the electrolyte sheet is rectangular and circular are shown. FIG. 3 is a schematic plan diagram showing the locations of the measurement in the rectangular electrolyte sheet for the optical and laser-based non-contact three-dimensional profile measuring system. FIG. 4 is a schematic plan diagram showing the locations of the measurement in the circular electrolyte sheet for the optical and laser-based non-contact three-dimensional profile measuring system. As shown in FIG. 3, when the electrolyte sheet 8 is rectangular (length of vertical edge: α, length of horizontal edge: β), the locations of the measurement are the center of the sheet (point A), the points on the diagonal lines with a distance defined by $\{(\alpha+\beta)\times 0.11\}$ from the corners (point B, point C, point D and point E), and the points on the lines connecting the middle point of the edges and the center of the sheet with a distance defined by $\{(\alpha+\beta)\times 0.125\}$ from the edges (point F, point G, point H and point I). As shown in FIG. 4, when the electrolyte sheet 8 is circular, the locations of the measurement are the center of the gravity of the sheet (point a), points on four lines with a distance defined by $(\gamma\times 0.2)$ from the circumference (points b-i), where γ is a distance between the center of the gravity and the circumference on the line, and where the four lines are one arbitrary line passing the center of the gravity and three lines forming angles of 45°, 90° and 135° respectively with the arbitrary line at the center of the gravity.

In the electrolyte sheet of the present invention, the average distance between the peaks is 0.1 µm to 30 µm, and the average valley depth is 0.05 µm to 20 µm. If the average distance between the peaks is below 0.1 µm or the average valley depth is below 0.05 µm, it is difficult to form the concaves consistently. On the other hand, if the average distance between the peaks exceeds 30 µm or the average valley depth exceeds 20 µm, the strength of the electrolyte sheet declines, and the Weibull modulus becomes inferior.

The average distance between the peaks is preferably 0.2 µm or more, more preferably 0.3 µm or more, and most preferably 0.5 µm or more. And, the average distance between the peaks is preferably 20 µm or less, more preferably 10 µm or less, and most preferably 5 µm or less. The average valley depth is preferably 0.1 µm or more, more preferably 0.2 µm or more, and most preferably 0.3 µm or more. And, the average valley depth is preferably 10 µm or less, more preferably 5 µm or less, and most preferably 3 µm or less.

Figure 5:
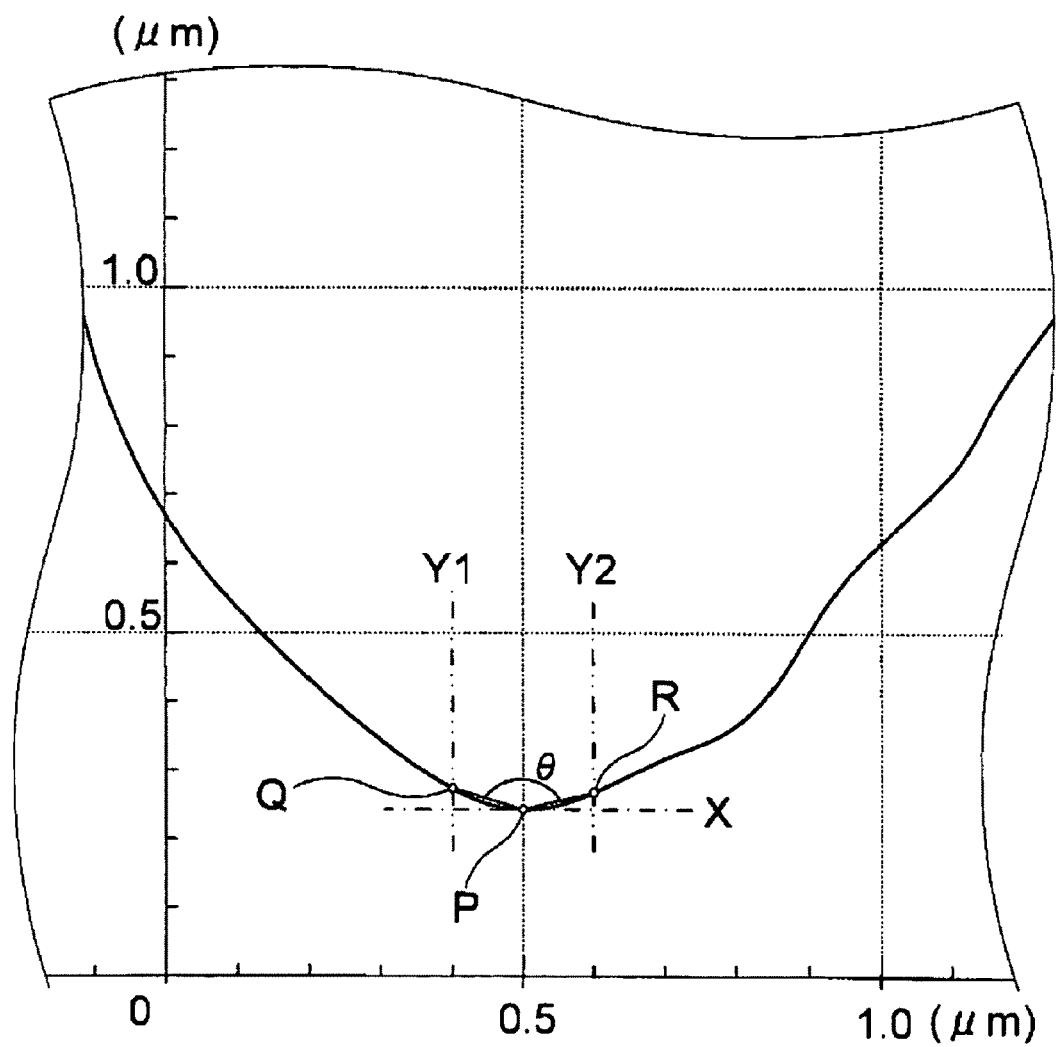
FIG. 5 is a magnified schematic diagram of a bottom portion of a concave when a shape of the bottom of the concave is not acutely angled.

Whether the tip of the concave in the roughness curve is acutely angled or not is determined as following. In the beginning, the method of determining the shape of the tip of the concave is explained, referring to FIG. 5. First, a scale-adjusted roughness curve is generated, in which the scale of the horizontal axis (length direction) and the scale of the vertical axis (height and depth direction) are made the same. For example, if the scale of the vertical axis is set as one scale (1 µm)=1 mm, the scale of the horizontal axis is also set as one scale (1 µm)=1 mm.

In the scale-adjusted roughness curve obtained, the shape of the tip of the concave (valley bottom) is observed, and a line X (dashed line) is drawn. This line X is parallel to the horizontal axis and passes the tip of the concave P. Next, normal lines Y1 and Y2 (two-dot chain lines) are drawn on the line X from the points having a 0.1 µm of distance from the tip of the concave P in left and right directions. And, points at intersections Q and R of the normal lines Y1 and Y2 and the roughness curve are respectively determined. Then, the angle θ, which is formed between the line PQ, which connects the intersection Q and the tip of the concave P, and the line PR, which connects the intersection R and the tip of the concave P, is measured. If this angle θ is 90° or more and the scale-adjusted roughness curve between Q and R is a continuous curve without a deflection point, then it is defined as a shape that is not acutely angled. Here, the term 'the scale-adjusted roughness curve between Q and R is a continuous curve' is defined as differentiation is possible at any point on the scale-adjusted roughness curve between Q and R.

The area of the electrolyte sheet of the present invention is preferably 50 cm$^2$ or more, more preferably 100 cm$^2$ or more. And, the area of the electrolyte sheet is preferably 1000 cm$^2$ or less, and more preferably 600 cm$^2$ or less. The technology provided in the present invention is more effective for thin and large sized electrolyte sheets such as those having an area of 50 cm$^2$ to 1000 cm$^2$ and a thickness of 100 µm to 400 µm.

1-2. Materials of the Electrolyte Sheet

The material constituting the electrolyte sheet of the present invention is not particularly limited if it is a ceramic having oxygen ion conductivity. However, the material is preferably at least one substance selected from the group consisting of zirconia, ceria, and lanthanum gallate oxide. In other words, the electrolyte sheet preferably contains at least one element selected from the group consisting of zirconium, cerium, lanthanum, and gallium.

When the zirconia is used, the zirconia can be stabilized with scandium oxide, yttrium oxide, cerium oxide or ytterbium oxide. When the ceria is used, the ceria can be doped with yttria, samaria or gadolinia. When the lanthanum gallate oxide is used, the lanthanum gallate type perovskite structure oxide can be employed, in which a part of lanthanum or gallium in the lanthanum gallate is replaced by strontium, calcium, barium, magnesium, aluminum, indium, cobalt, iron, nickel or copper.

It is particularly preferable to use a zirconia stabilized with 3 mol % to 10 mol % of yttrium oxide, a zirconia stabilized with 4 mol % to 12 mol % of scandium oxide, or a zirconia stabilized with 4 mol % to 15 mol % of ytterbium oxide. In addition, alumina, silica or titania can be added to such a stabilized zirconia as a sintering aid or as a dispersion reinforcing agent.

2. Method of Manufacturing the Electrolyte Sheet

Next, the method of manufacturing the electrolyte sheet, regarding the second embodiment of the present invention, will be explained in detail below.

The method of manufacturing an electrolyte sheet for solid oxide fuel cell includes a step of pressing one or both sides of an electrolyte green sheet with a stamper. The stamper has plural convexes and/or concaves. The shape of the basal plane of the convex or the concave is circular, elliptical, or polygonal with its corners rounded so that the corners have a curvature radius of 0.1 µm or more. Or, the three-dimensional shape of the convex or the concave is hemispherical, hemi-ellipsoidal or polyhedral with its corners or ridges having a curve of a curvature radius of 0.1 µm or more in the cross-sectional view. The basal plane of the convex or the concave has a circle-equivalent diameter between 0.8 µm and 380 µm. The convex or the concave has a height or a depth between 1.1 µm and 186 µm.

2-1. Preparation of Electrolyte Green Sheet

The electrolyte green sheet is obtained by forming a slurry into a sheet shape, followed by drying. The slurry contains, for example, an electrolyte sheet material, a binder, a solvent, a dispersing agent and a plasticizer.

The binder is not particularly limited and conventionally known organic binders can be appropriately used. Examples of the organic binders include ethylene copolymers, styrene copolymers, acrylate and/or methacrylate copolymers, vinyl acetate copolymers, maleic acid copolymers, vinyl butyral resins, vinyl acetal resins, vinyl formal resins, vinyl alcohol resins, waxes and cellulose resins such as ethyl cellulose. Such a binder can be used either alone or as a mixture of two or more kinds. Among these binders, from the view point of processability for forming the concaves or convexes on the green sheet and thermal degradation during firing, (meth) acrylate copolymers, which are thermoplastic with a 20,000 to 250,000 of number average molecular weight, and a −40° C. to 20° C. of glass transition temperature, are recommended as a preferred binder. The number average molecular weight can be measured by a standard method. However, if the binder is a commercially available binder and there are values in the catalog, such catalog values may be referenced.

The ratio of the binder to the electrolyte sheet material is preferably 15 mass parts or more, more preferably 16 mass parts or more of the binder for 100 mass parts of the electrolyte sheet material. And, the ratio of the binder to the electrolyte sheet material is preferably 30 mass parts or less, and more preferably 24 mass parts or less of the binder for 100 mass parts of the electrolyte sheet material. If the amount of the binder is insufficient, formability of the green sheet declines, and strength and flexibility will be unsatisfactory. On the contrary, if the amount of the binder is excessive, not only does the adjustment of slurry viscosity become difficult, but emission of decomposed binder also becomes intense during firing, resulting in uneven shrinkage. Furthermore, the binder can easily remain in the electrolyte sheet as residual carbon.

Examples of the solvents include alcohols such as methanol, ethanol, 2-propanol, 1-butanol and 1-hexanol; ketones such as acetone and 2-butanone; aliphatic hydrocarbons such as pentane, hexane and heptane; aromatic hydrocarbons such as benzene, toluene and xylene; and acetic acid esters such as methyl acetate, ethyl acetate and butyl acetate. The solvent is appropriately selected and used. The solvent can be used either alone, or as a mixture of two or more kinds. The amount of the solvent may be adjusted such that the viscosity of the slurry can be suitably adjusted at the time of forming the electrolyte green sheet. And, the viscosity may be preferably in the range of 1 Pa·s to 50 Pa·s, and more preferably 2 Pa·s to 20 Pa·s.

Examples of the dispersing agents include polymeric electrolytes such as polyacrylic acid and ammonium polyacrylate; organic acids such as citric acid and tartaric acid; copolymers of maleic anhydride with isobutylene or styrene and their ammonium salts or amine salts; and copolymers of butadiene and maleic anhydride and their ammonium salts. By using the dispersing agent, peptization or dispersion of the electrolyte sheet material is promoted.

Examples of the plasticizers include phthalate ester such as dibutyl phthalate, dioctyl phthalate and ditridecyl phthalate; glycols or glycol ethers such as propylene glycol; and polyesters such as phthalate polyesters, adipate polyesters and sebacate polyesters. By using the plasticizer, peptization or dispersion of the electrolyte sheet material is promoted.

In addition to the components mentioned above, surfactants or defoaming agents and etc. can be added to the slurry if necessary.

The method of forming the slurry into the sheet shape is not particularly limited, and standard methods such as doctor blade or extrusion molding can be used. The electrolyte green sheet is obtained by drying the slurry that has been formed into the sheet shape.

The thickness of the electrolyte green sheet is suitably adjusted. However, 100 µm to 400 µm of the thickness is optimal. The electrolyte green sheet may be punched or cut to be a proper size. The size of the electrolyte green sheet is 50 mm to 400 mm×50 mm to 400 mm for a square shape, and 50 mm φ to 400 mm φ for a circular shape.

The electrolyte green sheet has a characteristic of the elongation at break in the tensile test at the temperature of pressing the stamper that is preferably 20% or more, more preferably 25% or more, and most preferably 30% or more. And, such elongation at break is preferably 500% or less, more preferably 400% or less, and most preferably 300% or less. The tensile yield strength in the tensile test at the temperature of pressing the stamper is preferably 1.96 MPa (20 kgf/cm$^2$) or more, and more preferably 2.45 MPa (25 kgf/cm$^2$) or more. And, such tensile yield strength is preferably 19.6 MPa (200 kgf/cm$^2$) or less, more preferably 17.6 MPa (180 kgf/cm$^2$) or less, and most preferably 14.7 MPa (150 kgf/cm²) or less. Here, the elongation at break is the elongation by the tensile stress at the moment of rupture of the specimen. The tensile yield strength is a tensile stress at the first instance wherein non-elastic elongation is found, in the load-elongation curve of when a specimen is stretched under a tensile load (the value obtained by dividing the tensile load applied to the specimen by the original cross-sectional area in the specimen gauge line).

The green sheet has a characteristic of the maximum stress in the tensile test at a temperature of 23° C. that is preferably 3.0 MPa or more, and more preferably 4.0 MPa or more, and most preferably 5.0 MPa or more. And, such maximum stress is preferably 20.0 MPa or less, more preferably 18.0 MPa or less, and most preferably 15.0 MPa or less. The elongation at maximum stress load at 23° C. is preferably 5.0% or more, more preferably 7.0% or more, and most preferably 10.0% or more. And, such elongation is preferably less than 30.0%, more preferably 25.0% or less, and most preferably 20.0% or less.

To measure the maximum stress and the elongation at maximum stress load, first, a tensile load is applied to a green sheet sample by using a tensile testing machine, and a stress and a strain are measured. From the stress and the strain, an SS curve (a graph of the relation between the stress and the strain) is obtained. From the SS curve obtained, the maximum stress is determined from the maximum stress loaded when the green sheet sample is broken. The elongation is determined from the elongation of the green sheet sample at the point where the maximum stress is loaded.

In order to produce a green sheet having the above physical properties, it is particularly preferable to use a (meth)acrylate copolymer, as a binder, that has a 50,000 to 200,000 of number average molecular weight, and a −30° C. to 10° C. of glass transition temperature. The amount of this copolymer as a binder is preferably 12 mass parts to 30 mass parts, in solid equivalent, for 100 mass parts of the electrolyte sheet material.

2-2. Stamper

The stamper, which is used for forming the concaves and/or convexes in the electrolyte green sheet, is explained below. The stamper has plural convexes or concaves. The shape of the basal plane of the convex or the concave is circular, elliptical or polygonal with its corners rounded so that the corners have a curvature radius of 0.1 μm or more. Or, the three-dimensional shape of the convex or the concave is hemispherical, hemi-ellipsoidal or polyhedral with its corners or ridges having a curve of a curvature radius of 0.1 μm or more in the cross-sectional view. The basal plane of the convex or the concave has a circle-equivalent diameter between 0.8 μm and 380 μm. The convex or the concave has a height or a depth between 1.1 μm and 186 μm.

The shape of the basal plane of the convex or the concave has a circular shape, an elliptical shape or a polygonal shape with its corners rounded and with the rounded corners having a curvature radius of 0.1 μm or more. When such a polygon is employed, it is preferable that all the corners of the polygon have curved shapes having a curvature radius of 0.1 μm or more. By making the shape of the basal plane edgeless, it is possible to make edgeless concaves or convexes on the electrolyte sheet. The shape of the basal plane is preferably circular or elliptical, and more preferably circular. Three-dimensional shape of the convex or the concave is hemispherical, hemi-ellipsoidal or polyhedral with its corners or ridges having a curve of a curvature radius of 0.1 μm or more in the cross-sectional view. When such a polyhedron is employed, it is preferable that all the edges or ridges of the polyhedron have curved shapes of a curvature radius of 0.1 μm or more. By forming the three-dimensional shape of the convex or the concave into such a shape, it is possible to make edgeless concaves or convexes on the electrolyte sheet. The three-dimensional shape of the convex or the concave is preferably hemispherical or hemi-ellipsoidal, and more preferably hemispherical.

The circle-equivalent diameters of the basal planes of the convexes or concaves are 0.8 μm or more, preferably 8 μm or more, and more preferably 25 μm or more. Furthermore, the circle-equivalent diameters of the basal planes of the convexes or concaves are 380 μm or less, preferably 320 μm or less, and more preferably 240 μm or less. If the circle-equivalent diameters are within such a range, it is possible to provide concaves or convexes on the electrolyte sheet that have a desirable average circle-equivalent diameter. Although it is possible to arrange convexes or concaves having various circle-equivalent diameters on a stamper, it is preferable that all the convexes or concaves have a uniform circle-equivalent diameter.

The heights of the convexes and the depths of the concaves are preferably 1.1 μm or more, more preferably 4 μm or more, and most preferably 11 μm or more. And the heights of the convexes and the depths of the concaves are preferably 186 μm or less, more preferably 150 μm or less, and most preferably 110 μm or less. If the heights or the depths are within such a range, it is possible to provide concaves or convexes on the electrolyte sheet that have a desirable height or depth. Although it is possible to arrange convexes or concaves having various heights or depths on a stamper, it is preferable that all the convexes or concaves have a uniform height or depth.

Gaps between the highest points of the convexes (the gap between the highest points of two adjacent convexes) or gaps between the lowest points of the concaves (the gap between the lowest points of two adjacent concaves) may be uniform or not. However, being uniform is preferred. It is preferable that each convex or concave does not overlap to each other. Taking an account of the average circle-equivalent diameter of the convexes or the concaves, the difference between the gap and the average circle-equivalent diameter (gap—average circle-equivalent diameter) is preferably 0.2 μm or more and more preferably 1.0 μm or more. And, the difference between the gap and the average circle-equivalent diameter is preferably 50 μm or less, and more preferably 30 μm or less. It is preferable to provide a taper near the basal plane of the convex or concave in an outer radial direction. This provides a superior mold-release characteristic.

Figure 6:
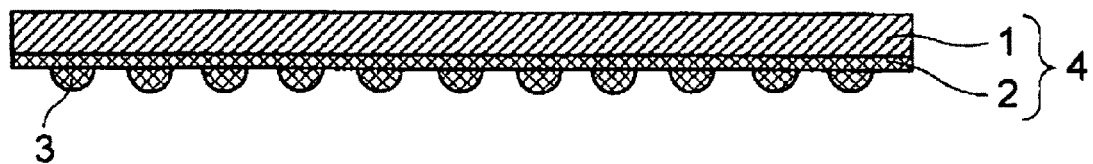
FIG. 6 is a schematic diagram of a stamper.

As a method of forming the convexes or concaves on the stamper, any method can be employed as long as convexes or concaves can be formed on a metallic or resinous material. However, methods of manufacturing a stamper used for producing optical information storage media such as optical disc or magneto-optical disc, in which micro patterns are transferred to the stamper, are preferably used. In other words, it is possible to easily manufacture the stamper, using photolithography and electroforming techniques that are used for the production of optical discs. The material of the stamper is preferably metallic or resinous. Further, the material of the stamper may be made of a combination of a metallic material and a resinous material. Or, the stamper may be made of one material. As shown in FIG. 6, a stamper 4 may also be constituted with a substrate 1 and a pressing part 2, on which convexes or concaves are provided. In such a case, the substrate and the pressing part may be made of a same material or different materials.

Examples of the metallic materials used for the stamper include tungsten carbide, stainless steel, stellite, nickel-based metals, nickel alloys, special steel and cemented carbide. Examples of the resinous materials used for the stamper include engineering plastics such as polyacetal, polyamide, polycarbonate, modified-polyphenyleneether, polybutylene terephthalate, polyarylate, polysulfone, polyethersulfone, polyphenylene sulfide, polyetheretherketone, polyimide and polyetherimide; and fluororesins such as polytetrafluoroethylene, tetrafluoroethylene-hexafluoropropylene copolymer, polyvinylidene difluoride, polychlorotrifluoroethylene and tetrafluoroethylene/perfluoroalkyl vinyl ether copolymer. Among these, when the stamper is produced by photolithography and electroforming, nickel-based metals are optimal. If the stamper is constituted with the substrate and the pressing part, the pressing part is preferably made of a fluororesin, which is superior in detaching the mold from the green sheet after forming the concaves. When a metal is used for the pressing part, it is preferable to surface-treat the pressing part by a fluororesin to improve the detachability of the metallic mold from the green sheet.

2-3. Formation of the Concaves and/or Convexes

The method of pressing the stamper onto the electrolyte green sheet is particularly not limited. The electrolyte green sheet may be pressed by the stamper installed in a known pressing machine. For example, an electrolyte green sheet is sandwiched by two stampers or placed on a stamper and mounted on a bottom stage of a pressing machine. By pressurizing this from a top stage, the concaves and convexes are formed. The stage is preferably a heating stage that can heat the electrolyte green sheet at 30° C. to 100° C. During this step, it is possible to control the depth, the height and the circle-equivalent diameter of the concave or convex formed, by controlling a pressing pressure, a duration of pressing time, and a pressing temperature (temperature of the green sheet). The larger the pressing pressure, the longer the pressing duration of time, the higher the pressing temperature, the more easily the concaves and the convexes are formed.

The pressing pressure to press the stamper is preferably 1.96 MPa (20 $kgf/cm^2$) or more, more preferably 2.94 MPa (30 $kgf/cm^2$) or more, and most preferably 9.81 MPa (100 $kgf/cm^2$) or more. And, the pressing pressure is preferably 49.0 MPa (500 $kgf/cm^2$) or less, more preferably 39.2 MPa (400 $kgf/cm^2$) or less, and most preferably 29.4 MPa (300 $kgf/cm^2$) or less. The duration of pressing time to press the stamper is preferably 0.5 second or more, more preferably 1 second or more, and most preferably 2 seconds or more. And, the duration of pressing time is preferably 300 seconds or less, more preferably 180 seconds or less, and most preferably 120 seconds or less. If the pressing pressure is 1.96 MPa or more and the duration of pressing time is 0.5 second or more, the concaves or convexes can be formed satisfactorily on the electrolyte green sheet. If the pressing pressure is 49.0 MPa or less and the total pressing time is 300 seconds or less, energy and time are efficiently used. In addition, there hardly occurs a problem that detaching the green sheet from the stamper is difficult. Moreover, if the pressing operation is carried out within the above range, it is easy to control the roughness of the green sheet based on the pressing pressure and pressing duration of time. When the electrolyte green sheet is pressed by a stamper having convexes as shown in FIG. 1, it is preferable that only the convexes of the stamper presses the electrolyte green sheet.

The moldability of the electrolyte green sheet increases as the temperature of the electrolyte green sheet increases at the time when the stamper presses the electrolyte green sheet. This makes it easy to transfer the shapes of the convexes or the concaves on the mold to the electrolyte green sheet. However, adjusting the roughness of the electrolyte green sheet by controlling the temperature necessitates a means for temperature control. In addition, if the temperature is set too high, the green sheet can adhere to the stamper, and the detachment of the green sheet from the stamper can be difficult after pressing. In this respect, the temperature of the electrolyte sheet during pressing is preferably 20° C. or more, and more preferably 30° C. or more. And, the temperature of the electrolyte sheet during pressing is preferably 80° C. or less, and more preferably 60° C. or less.

An alternative way of pressing the electrolyte green sheet is to sandwich the electrolyte green sheet with the stampers and sandwich this with an acrylic plate, wooden plate or metal plate. By stacking these, many electrolyte green sheets can be pressed altogether. Any kinds of pressing machines can be employed, including one-shafted, two-shafted and four-shafted pressing machines. However, the four-shafted pressing machine is preferable because it can apply the pressure to the green sheet more uniformly.

After the pressing process, the electrolyte green sheet is detached from the stamper preferably within 3 hours, more preferably within 1 hour, and most preferably within 10 minutes. Unnecessarily waiting may cause a difficulty of detachment.

Other than the method of forming the concaves in the above embodiment, the following methods can also be carried out:

(a) Spherical fine particles made from organic resin or ceramic are sprinkled on an electrolyte green sheet. And, the particles are embedded in the electrolyte green sheet, preferably about in half, by pressing the particles or the electrolyte green sheet. The electrolyte green sheet is fired together with the particles embedded. By firing, the particles are removed (in the case of ceramic spherical fine particles, the particles are eliminated after firing), and the concaves are formed.

(b) Tapes, on which spherical fine particles are adhered, are placed on the top and bottom surfaces of an electrolyte green sheet, or placed on either of the surfaces. Then, the electrolyte green sheet is pressed, resulting in the formation of the concaves.

(c) A tape, on which spherical particles are adhered, is adhered to a metallic mold. Then, an electrolyte green sheet is pressed with this metallic mold, resulting in the formation of the concaves.

(d) A slurry of a raw material of the electrolyte green sheet is administered on a tape, on which spherical fine particles are adhered.

In the case of method (a), one method of forming the concaves is to sprinkle the spherical fine particles on one side or both sides of the electrolyte green sheet and to press the electrolyte green sheet. The other method is to press a tape on which the spherical fine particles are adhered, onto one side or both sides of the electrolyte green sheet. The spherical particles are uniformly sprinkled on the electrolyte green sheet by known machines. One example of such machines is a machine, which superpositions and uses two kinds of masks, one having one size of micropores and the other having another size of micropores, for spreading a powder (spacers) on a liquid crystal display device (Japan Patent Application Publication H6-194616). Another example of such machines is a machine, which has a plate whose openings are adjusted based on a ratio of average particle size of a sintering powder to the opening diameter (Japan Patent Application Publication 2007-217741). The method of sprinkling the particles is not particularly limited unless the particles are uniformly sprinkled on the entire surface of the green sheet. However, it is preferable to sprinkle a constant amount of the spherical particles on each green sheet by moving the electrolyte green sheets at a constant speed, and vibrating a hopper loaded with the spherical fine particles over the electrolyte green sheet at a constant vibration frequency.

In the above method, the green sheet can be moved at a constant speed by belt conveyor or roller conveyor. A hopper is provided above a roller conveyor, which enables the electrolyte green sheet cut into a desired shape to be moved at a constant speed. The hopper is equipped with a powder reservoir, which enables the amount of the spherical powder in the hopper to be constant. The spherical particles are supplied from the powder reservoir to the hopper by piping so that the amount of the powder in the hopper becomes constant. If the hopper is vibrated at a constant vibration frequency, the spherical particles are sprinkled on the electrolyte green sheet at a constant rate through a rectangular outlet provided with an outlet filter having a 100 mesh to 400 mesh.

To sprinkle the particles on the green sheet more uniformly, feeding rate of the powder from the powder reservoir to the hopper is set as 0.1 g/min to 1 g/min, and preferably 0.2 g/min to 0.8 g/min, if the spherical fine particles are made from an organic resin. In addition to the fine spherical particles, balls made of zirconia or alumina with a 2 mm to 20 mm of diameter may be provided in the hopper. If the hopper is vibrated at preferably a 50 Hz to 500 Hz, and more preferably 80 Hz to 300 Hz of vibrational frequency in a vertical direction, a horizontal direction or a combination of vertical and horizontal directions, a constant amount of the spherical particles can be uniformly sprinkled on the electrolyte green sheet. The amount of the sprinkling quantity per 100 $cm^2$ of the green sheet is preferably 2 mg to 200 mg, more preferably 10 mg to 150 mg, and most preferably 20 mg to 100 mg. If there are organic spherical micro-particles that do not contribute to forming the concaves, it is possible to remove such particles on the green sheet by brushing or air blowing.

Here, the spherical fine particles are the spherical particles whose average particle diameter is 0.01 μm to 50 μm, preferably 0.1 μm to 20 μm, more preferably 0.2 μm to 10 μm, and most preferably 0.3 μm to 5 μm. The particle diameters can be uniform, or the distribution of the particle diameters can be large. The shape of the particles does not have to be exactly spherical, and spherical and ellipsoidal particles may be used. However, to form uniform concaves on the electrolyte sheet, fine spherical particles having a uniform particle size are preferable. The spherical particles may be fine spherical particles made of an organic resin, an inorganic material and a composite of organic and inorganic materials.

Examples of the fine spherical particles made of organic resins include particles made of polymethylmethacrylate crosslinked material (product of Nippon Shokubai Co., Ltd., product name 'Epostar (registered trademark) MA', average particle diameter: 2 μm-15 μm), benzoguanamine-formaldehyde condensate (product of Nippon Shokubai Co., Ltd., product name 'Epostar', average particle diameter: 1 μm 15 μm), benzoguanamine-melamine-formaldehyde condensate (product of Nippon Shokubai Co., Ltd., product name 'Epostar', average particle diameter: 2.5 μm-4 μm), melamine-formaldehyde condensate (product of Nippon Shokubai Co., Ltd., product name 'Epostar', average particle diameter: 1 μm-2 μm), and crosslinked polystyrene (product of Sekisui Plastics Co., Ltd., grade 'SBX Series', average particle diameter: 6 μm-17 μm).

Examples of the organic-inorganic composite fine particles include particles made of silica-acrylic composite compound (product of Nippon Shokubai Co., Ltd., product name 'Soliostar' (registered trademark), average particle diameter: 1.1 μm-6.5 μm).

Examples of the inorganic fine spherical particles include particles made of amorphous silica (product of Nippon Shokubai Co., Ltd., product name 'Seahostar' (registered trademark), average particle diameter: 0.08 μm-2.75 μm), and zirconia beads (product of Toray Industries, Inc., product name 'Torayceram' (registered trademark) TZB', average particle diameter: 30 μm).

Further, the spherical particles may be fine spherical oxide particles, which have a 0.5 μm-50 μm, and preferably 1 μm-30 μm of diameter. The fine spherical oxide particles may be obtained by forming oxide particles, made of zirconia and/or alumina, or its precursor particles to be spherical with their diameter being 0.8 μm-80 μm by spray drying. Then, the oxide particles or the precursor particles are heat-treated at 800-1400° C. for 1 to 10 hours. Particularly preferred spherical particles are spherical resin fine particles made of polymethylmethacrylate crosslinked material with 1 μm-15 μm of average particle diameter because these particles are removed during firing the green sheet and an exothermic reaction is prevented during that time.

In the case of methods (b), (c) and (d) employing a tape to which the fine spherical particles are adhered, if the electrolyte green sheet in the method (a) is replaced by a tape, the particles are adhered to the tape. Examples of the materials of the tape include PET film, stainless sheet and zirconia sheet. Although not limited, examples of adhesives applied on the tape include organic adhesives such as acrylic resin adhesive, urethane resin adhesive, ethylene-vinyl acetate resin adhesive, epoxy resin adhesive, chloroprene rubber adhesive, cyanoacrylate resin adhesive, and silicone adhesive; and inorganic adhesives such as silica adhesive, alumina adhesive, zirconia adhesive, silica-alumina adhesive, and silica-zirconia adhesive.

The electrolyte sheet can be obtained by firing the electrolyte green sheet, on which the concaves or the convexes are formed or the fine spherical particles are embedded, prepared as above. The condition of firing is not particularly limited, and standard conditions are employed. For example, the electrolyte green sheet is first heat-treated at 150° C. to 600° C., and preferably 250° C. to 500° C. for 5 hours to 80 hours to remove organic components such as binder and plasticizer as well as organic resin fine spherical particles, from the electrolyte green sheet. Then, the electrolyte green sheet is fired at 1000° C. to 1600° C., and preferably 1200° C. to 1500° C. for 2 hours to 10 hours. Thereby, the electrolyte sheet, on which concaves or the convexes are formed, is obtained.

3. Cell for Solid Oxide Fuel Cell

Below, a cell for solid oxide fuel cell of the fourth embodiment of the present invention is explained. The cell for solid oxide fuel cell of the present embodiment is characterized by using the electrolyte sheet of the first embodiment.

The electrolyte sheet according to embodiments of the present invention has concaves and/or convexes having a desired size and shape on its surface. Therefore, if the electrolyte sheet of the present invention is used as an electrolyte membrane of a cell of a solid oxide fuel cell, efficient power generation is possible because the contact area between the electrolyte membrane and electrodes is large. In addition, since the adhesion of the electrolyte membrane to the electrodes is superior, a long-term, stable power generation is possible. Furthermore, as the places that can be origins of cracks are reduced, sheet strength and its Weibull modulus is enhanced. Therefore, the reliability of the cell is improved.

The cell for solid oxide fuel cell of the present invention is obtained by providing a fuel electrode on one surface of the electrolyte sheet, and providing an air electrode on the other surface of the electrolyte sheet by, for example, screen printing. The order of forming the fuel electrode and the air electrode is not limited. However, the electrode whose required firing temperature is lower may be formed first by film-forming on the electrolyte sheet and by firing. The other electrode may be film-formed and fired next. Alternatively, both the fuel electrode and the air electrode can be formed simultaneously. To prevent high resistant components from being generated due to solid phase reaction between the electrolyte sheet and the air electrode, a ceria intermediate layer may be provided as a barrier layer between the electrolyte sheet and the air electrode. In this case, the fuel electrode is provided on a surface opposite to the surface on which the intermediate layer was provided or is to be provided. And, the air electrode is provided on the intermediate layer. The order of forming the intermediate layer and the fuel electrode is not limited. The intermediate layer and the fuel electrode can be formed simultaneously by coating and drying a paste for the intermediate layer and a paste for the fuel electrode on surfaces of the electrolyte sheet, followed by firing.

Materials of the fuel electrode, the air electrode and the intermediate layer can be selected from conventionally known materials. Furthermore, conventionally known methods are employed for applying, drying and firing the pastes.

In the solid oxide fuel cell, the oxygen permeating through the electrolyte triggers an electrode reaction on the three-phase boundary (electrolyte sheet/electrode/gas phase). Therefore, by enhancing the surface area of the electrolyte sheet and increasing the contact points between the electrode materials and the electrolyte sheet, the power density of the fuel cell is improved. Because of this, in the case of providing the concaves on the electrolyte sheet for said solid oxide fuel cell, and forming the fuel electrode and/or the air electrode directly on the electrolyte sheet, it is preferable to set the average particle diameter of at least either of the electrode particles constituting the fuel electrodes or the electrode particles constituting the air electrodes as $1/10$ or less of the average circle-equivalent diameter of the concave. Thereby, plural electrode particles can be provided in one concave of the electrolyte sheet, and the number of contact points between the electrolyte sheet and the electrode particles are further increased. The average particle diameter of the electrode particles mentioned above is more preferably $1/20$ or less, and most preferably $1/30$ or less of the average circle-equivalent diameter of the concaves.

The cell for solid oxide fuel cell in the present embodiment, in which the fuel electrode, the air electrode and the intermediate layer are formed on the electrolyte sheet, has a large contact area between the electrolyte and the electrodes and between the electrolyte and the intermediate layer. Therefore, the cell of the present invention has extremely superior durability and power generation performance. Accordingly, the present invention enables to manufacture an electrolyte sheet that can be utilized as an electrolyte membrane of a solid oxide fuel cell, resulting in a superior performance. Thus, the present invention can contribute to the practical realization of the fuel cell.

EXAMPLES

The present invention is further concretely explained with the Examples below. However, the present invention is not limited by the following Examples. It is possible to modify the practice within the scope of context. Such modifications are also included within the scope of the present invention. Below are the methods of evaluating the samples.

1. Elongation at Break and Tensile Yield Strength

Manufacturing Examples 1-4

Measurement of elongation at break and tensile yield strength of green sheets were performed, following the tensile test methods for plastics (using specimen type no. 2) in JIS K 7113. Specimens were prepared from the green sheets respectively obtained in each Manufacturing Examples by cutting ten green sheets simultaneously, using a specimen cutting punch (manufactured by Dumbbell Co., Ltd., product name 'Super Dumbbell (registered trademark)', model: SDK-500, width of parallel section is 10 mm). The measurements were done, using Universal testing machine (manufactured by Instron Japan, model: 4301) as following. Both ends of the specimen were held by gripping jigs. The gripping jigs were pulled at a 100 mm/min of tensile speed, making the specimen break. Then, the elongation at break and the tensile yield strength at that moment were measured.

Manufacturing Examples 5-18

Using Super Dumbbell Cutter SDK-200, which is a SD model lever type sample cutter manufactured by Dumbbell Co., Ltd., following-sized specimens were prepared from various lengths of the green sheets. Then, Stress-Strain curves (SS curves) were determined under the following conditions. Prior to the measurement, the specimens were kept in a test room for at least 1 hour to acclimate to the temperature and humidity. From the obtained SS curves, the maximum stress loaded when the green sheet sample fractured was determined as the tensile yield strength (maximum stress). Also, the elongation rate of the green sheet sample at the point where the maximum stress was applied was determined as the elongation at break.

Measuring device: Manufactured by Instron Japan, Universal Material Testing Machine Model 4301

Measuring temperature: 23° C.

Measuring humidity: 60%

Specimen: sample length: 100 mm, parallel section (width of narrowest section): 10 mm, width of grip section: 25 mm Gap of gripping jigs: 70 mm Tension rate: 10 mm/min 2-1. Average Distance Between the Peaks, Average Valley Depth, and Shape of the Concave Picking up nine points in the 10 cm×10 cm square electrolyte sheet obtained in the Manufacturing Examples 1-4, the roughness curves of the electrolyte sheet were determined with a 4 mm of scan length, using an optical and laser-based non-contact three-dimensional profile measuring system (manufactured by UBM Co. Ltd., product name: 'Microfocus Expert', Model no.: UBC-14 System). As shown in FIG. 3, the locations of the nine measurement points were at the center of the sheet (point A), the positions on the diagonal lines 2.2 cm-distant from the corners (point B, point C, point D and point E), and positions on the lines connecting the center of the sheet and the middle points of the edges and being 2.5 cm-distant from the edges (point F, point G, point H and point I). Nine scale-adjusted roughness curves were obtained by correcting the scales of the vertical axis and the horizontal axis of the obtained roughness curves. All the distances between the peaks found in each curve were measured, and the average value was calculated, yielding the average distance between the peaks. Also, the valley depths of all the concaves found in each curve were measured, and the average value was calculated, yielding the average valley depth. Further, about all the concaves found in each curve, it was checked whether the tip of the concave was acutely angled or not.

2-2. Average Circle-Equivalent Diameter, Average Depth, Average Height and Curvature Radius of Concaves or Convexes In a region of 5 μm-2 mm×5 μm-2 mm square on the surface of the electrolyte sheet (the region includes at least the center of the surface of the electrolyte sheet, and the region contains fifty concaves or convexes), all the shapes of the concaves were measured. This was performed by photographing a super-depth color image on the surface of the sheet, using a color 3D profile microscope (manufactured by Keyence Corp., model number: VK-9500) and a viewer application software (manufactured by Keyence Corp., 'VK VIEWER'). At the same time, the shapes of the concaves were measured by analyzing the profile of the surface shape of the sheet, obtained from the super-depth color image, using an analyzing application software (manufactured by Keyence Corp., 'VK ANALYZER').

More specifically, the photographed image of the sheet surface (corresponding to an XY axis) and the profile data of the concave shape (corresponding to a Z axis) were superposed, setting a line passing the centers of several concaves as a base. Then, the plane passing the intersection of the outermost peripheral contour of the concave on the photographed image and the shape profile of the concave was defined as a basal plane. The shape of the basal plane (plan-viewed shape of the concave) was specified from the shape of the outermost peripheral contour of the concave. If the shape of the basal plane of the concave was circular, the distance between two intersections of the outermost peripheral contour of the concave on the photographed image and the shape profile of the concave was defined as a circle-equivalent diameter of the basal plane. When the shape of the basal plane was not circular, first the area of the basal plane was measured or calculated. Then, the radius was calculated, assuming this area to be circular. The doubled value of the radius was defined as the circle-equivalent diameter.

To determine the depth of the concave, by defining a line passing the centers of the several concaves as a baseline as described above, the length of the normal line from the baseline to the lowest point of the concave in the concave profile was defined as the depth of the concave. All the circle-equivalent diameters and the depths of the concaves locating in the above-defined region were calculated. Then, the average circle-equivalent diameter and the average depth of the concaves were calculated. The average circle-equivalent diameter and the average height of the convexes were also obtained for convexes in a similar manner.

The radius of the curvature was measured as follows: The scales of the vertical axis and the horizontal axis of the above concave profile were set as the same. And, the curve was smoothened. Based on the R of the profile curve, the smallest circle that overlaps with this R was identified. Then, the radius of this circle was calculated.

The super-depth color 3D shape-measurement microscope was constituted with a measuring unit, a control unit, a console unit, and a monitor. The measuring unit was equipped with a laser light source of wavelength 408 nm and maximum output 0.9 mW, a photomultiplier tube as a photo receptor device, a light source having a 100 W halogen lamp for optical observation, a color camera having a ⅓ type color CCD image sensor as an imaging device, and a sample table.

3. Thickness of the Sheet

The thickness of the sheet was measured as follows: Super-depth color images of the cross-section of the sheet was photographed, using a color 3D profile microscope (manufactured by Keyence Corp., part number: VK-9500) and a viewer application software (manufactured by Keyence Corp., 'VK VIEWER') as described in the above section "2-2. Average Circle-Equivalent Diameter, Average Depth, Average Height and Curvature Radius of Concaves or Convexes". At the same time, the shapes of the concaves were measured by analyzing the profile of the surface of the sheet, obtained from the super-depth color image, using an analyzing application software (manufactured by Keyence Corp., 'VK ANALYZER'). The basal plane of one side of the sheet and the basal plane of the other side of the sheet were specified. The distance between the two basal planes were defined as the thickness of the sheet.

In more detail, the thickness of the sheet was obtained as follows: The baseline was measured as explained in the section "2-2. Average Circle-Equivalent Diameter, Average Depth, Average Height and Curvature Radius of Concaves or Convexes". In the places higher than the baseline, heights from the baseline were measured. And, an average height of these heights was calculated. Next, an apparent thickness was measured by micrometer. The value obtained by subtracting the average height from the apparent thickness was defined as the sheet thickness. When the concaves were formed on both sides of the electrolyte sheet, average heights were obtained for both sides in the places higher than the baselines. The value obtained by subtracting the sum of the two average heights from the apparent thickness was defined as the sheet thickness.

4. Flexural Strength and Weibull Modulus

Flexural strength was measured, following JIS R 1601. Twenty specimens having a 50 mm of length and a 5 mm of width were produced, using the green sheets same as the ones used in each Manufacturing Examples, and firing the green sheets in the same ways as those of the Manufacturing Examples. All the specimens were measured at room temperature, and their average was regarded as the flexural strength. From this flexural strength, the Weibull modulus was calculated.

5. Power Generation Performance

Using a small single cell-type power generator, a power generation test was performed at 800° C., and I-V curves were measured. Hydrogen was used as a fuel gas, and air was used as an oxidant. As a current-measuring device, the product 'R8240' of Advantest Corp. was used. As a current-voltage generator, the product 'R6240' of Advantest Corp. was used.

6. Flexural Strength of the Cell

Following ASTM F394-78, 30 mm φ of the cells prepared in the Manufacturing Examples was provided as specimens. And, a ring-on-ring strength test was performed on the cells. Specifically, a jig provided with a 16 mm-diameter ring (lower ring) was installed on a loading platform of a two-shafted universal strength testing machine (manufactured by Instron Co., model '4301'). On this jig, a cell for battery (cell for fuel cell) was mounted. On this cell, an 8 mm-diameter ring (upper ring) was further installed. The centers of the cell, the lower ring and the upper ring were aligned. Next, a weight stage was lowered at 0.5 mm/min of a loading speed, and the fracture test was performed by applying the weight to the cell. The weight at the time when the cell was fractured was read, and the flexural strength was calculated from this reading. The measurement was done on twenty cells for each cell group. Each flexural strength was calculated, and their average value was defined as the flexural strength of the cell for battery.

1. Manufacture of Stamper 1-1. Stamper No. 1

A photocrosslinkable photoresist was coated on a clean glass substrate. The photoresist was covered with a photo mask prepared beforehand (30 μm-diameter circles were arranged with an 8 μm pitch). Then the photoresist was exposed. After developing, uncross linked photoresist was washed off. Then, the photoresist was etched to round the corners of the phtoresist. Subsequently, electroforming (Ni plating) was performed until the thickness reached 0.3 mm. The Ni plate was detached from the glass substrate, and the photoresist was removed. Thereby, a stamper No. 1 having convexes was obtained.

1-2. Stampers Nos. 2-9

Stampers having convexes or concaves were produced as shown in Table 1, using photolithography and electroforming techniques similar to the technique of producing the stamper No. 1.

[Table 1]

2. Manufacture of the Electrolyte Sheet 2-1. Manufacturing Example 1

A raw material slurry was prepared by putting the following mixture into a nylon pot: 100 mass parts of zirconia powder stabilized by 6 mol % scandium (product of Daiichi Kigenso Kagaku Kogyo Co., Ltd, product name '6ScSZ', specific surface area: 11 $m^2/g$, average particle diameter: 0.5 μm, hereafter abbreviated as 6ScSZ), 17 mass parts (solid basis) of binder made of methacrylate copolymer (number average molecular weight: 100,000, glass transition temperature: −8° C., solid concentration: 50 mass %), and 3 mass parts of dibutyl phthalate as plasticizer in toluene/isopropanol mixed solvent (mass ratio: 3/2). The mixture was milled at 60 rpm for 20 hours, and the slurry was prepared. The slurry was transferred to a depressurizing defoaming container, and inside of the container was depressurized to be 3.99 kPa-21.3 kPa (30 Torr-160 Torr). Thereby, the slurry was concentrated and defoamed, resulting in a coating slurry having a viscosity of 2.5 Pa·s.

The obtained coating slurry was transferred to a slurry drum of a coating machine. The slurry was continuously coated on a PET film by doctor blade of a coating unit of the machine. The coated PET film was passed through a drying oven of its temperature 110° C., at a 0.15 m/min of speed. Thereby, the solvent was evaporated and dried, and about 180 μm-thick 6ScSZ green sheet was formed. The green sheet obtained had a 15% of elongation at break and a 13.9 MPa (142 kgf/$cm^2$) of tensile yield strength in the tensile test at 23° C.

Figure 7:
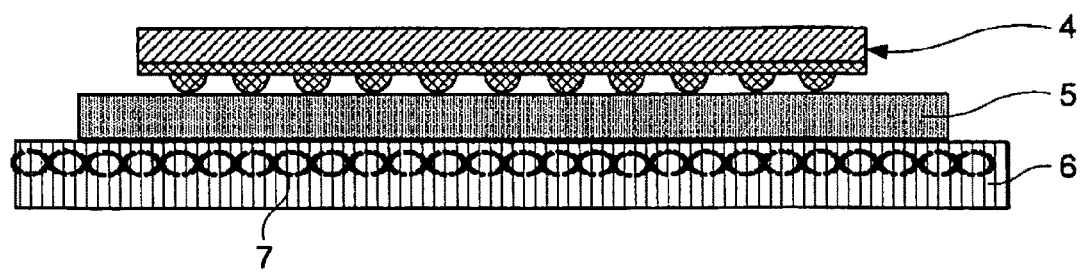
FIG. 7 is a schematic diagram of a pressing process using the stamper.

This 6ScSZ green sheet was cut into approximately 12 cm×12 cm square, and mounted on a heating table. A stamper was stacked on the green sheet, forming a stack as shown in FIG. 7 (heating table 6/green sheet 5/stamper 4). The pressing part and the substrate of the stamper were made of resin. The shape of the convex was hemispherical. The height of the convex was 15 μm. The diameter of the convex was 30 μm. The gap between the peaks of the adjacent convexes was 60 μm. And, the pressing part was coated with a fluororesin. The stack was mounted in a pressing unit of a compacting machine (Shinto Metal Industries Corporation, model 'S-37.5'), and pressurized with a 22.5 MPa (230 kgf/$cm^2$) of pressing pressure at a 25° C. of pressing temperature and for 2 seconds of pressing time. The stamper was detached from the green sheet, and a 6ScSZ green sheet, on which concave holes were formed, was obtained.

Figure 8:
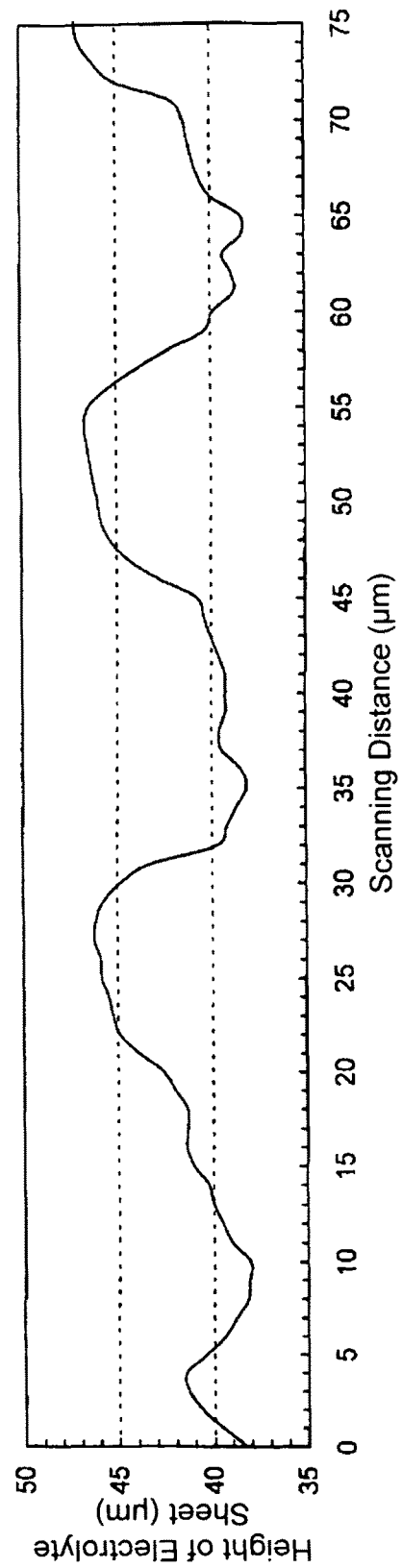
FIG. 8 is a scale-adjusted roughness curve of an electrolyte sheet obtained in Manufacturing Example 1.

By firing this green sheet at 1400° C. for 3 hours, a 10 cm×10 cm square 6ScSZ electrolyte sheet having a 160 μm of thickness was obtained. The average distance between the peaks, the average depth of the valley bottom, and the flexural strength of the obtained 6ScSZ electrolyte sheet were measured. Furthermore, the Weibull modulus was calculated. The results are shown in Table 2, and a representative roughness curve of the surface shape is shown in FIG. 8, whose scales are adjusted. None of the tips of the concaves observed in the roughness curve was acutely angled.

2-2. Manufacturing Example 2

A slurry was prepared as the Manufacturing Example 1 from the following composition: 100 mass parts of zirconia powder stabilized with 8 mol % yttrium (product of Daiichi Kigenso Kagaku Kogyo Co., Ltd, product name 'HSY-8.0', specific surface area: 10 $m^2/g$, average particle diameter: 0.5 μm, hereafter abbreviated as 8YSZ), 18 mass parts (solid basis) of binder made of methacrylate copolymer (number average molecular weight: 150,000, glass transition temperature: 5° C., solid concentration: 45 mass %), and 3.8 mass parts of dibutyl phthalate as plasticizer, in toluene/isopropanol mixed solvent (mass ratio: 3/2). The slurry was formed into an 8YSZ green sheet having about 250 μm of thickness by doctor blade. The obtained green sheet had a 48% of elongation at break and an 11.3 MPa (115 kgf/$cm^2$) of tensile yield strength in tensile test at 35° C.

This 8YSZ green sheet was cut into approximately 12 cm×12 cm square, and mounted on a heating table. A stamper was stacked on the green sheet, forming a stack (heating table/green sheet/stamper). The pressing part and the substrate of the stamper were made of a Ni alloy. The shape of the convex was hemispherical. The height of the convex was 2 μm. The diameter of the convex was 5 μm. The gap between the peaks of the adjacent convexes was 20 μm. And, the pressing part was coated with a fluororesin. The stack was mounted in a pressing unit of a compacting machine (Shinto Metal Industries Corporation, model 'S-37.5'), and pressurized with a 11.8 MPa (120 kgf/$cm^2$) of pressing pressure at a 40° C. of pressing temperature and for 30 seconds of pressing time. After pressurizing, the stack was cooled to be below 30° C. Then, the stamper was detached from the green sheet, and an 8YSZ green sheet, on which concave holes were formed, was obtained.

By firing this green sheet at 1450° C. for 3 hours, a 10 cm×10 cm square 8YSZ electrolyte sheet having a 220 μm of thickness was obtained. The average distance between the peaks, the average depth of the valley bottom, the flexural strength, and the Weibull modulus of the obtained 8YSZ electrolyte sheet were measured as the Manufacturing Example 1. The results are shown in Table 2. None of the tips of the concaves observed in the roughness curve was acutely angled.

2-3. Manufacturing Example 3

A slurry was prepared as did in the Manufacturing Example 1 from the following composition: 100 mass parts of commercially available $La_{0.9}Sr_{0.1}Ga_{0.8}Mg_{0.2}O_{3-\delta}$ powder (average particle diameter: 0.7 μm, specific surface area: 10 $m^2/g$, hereafter abbreviated as LSGM), 20 mass parts (solid basis) of binder made of methacrylate copolymer (number average molecular weight: 80,000, glass transition temperature: −15° C., solid concentration: 50 mass %), and 2.2 mass parts of dibutyl phthalate as plasticizer, in toluene/isopropanol mixed solvent (mass ratio: 3/2). The slurry was formed into an LSGM green sheet having an about 300 μm of thickness by doctor blade. The obtained green sheet had a 108% of elongation at break and a 9.02 MPa (92 kgf/$cm^2$) of tensile yield strength in tensile test at 45° C.

This LSGM green sheet was cut into approximately 12 cm×12 cm square, and mounted on a heating table. A stamper was stacked on the green sheet, forming a stack (heating table/green sheet/stamper). The pressing part of the stamper was made of fluororesin and the substrate of the stamper was made of resin. The shape of the convex was hemispherical. The height of the convex was 4 μm. The diameter of the convex was 10 μm. And, the gap between the peaks of the adjacent convexes was 15 μm. The stack was mounted in a pressing unit of a compacting machine (Shinto Metal Industries Corporation, model 'S-37.5'), and pressurized with a 5.88 MPa (60 kgf/cm$^2$) of pressing pressure at a 45° C. of pressing temperature and for 10 seconds of pressing time. After pressurizing, the stack was cooled to be below 30° C. Then, the stamper was detached from the green sheet, and an LSGM green sheet, on which concave holes were formed, was obtained.

By firing this green sheet at 1480° C. for 3 hours, a 10 cm×10 cm square LSGM electrolyte sheet having a 250 μm of thickness was obtained. The average distance between the peaks, the average depth of the valley bottom, the flexural strength, and the Weibull modulus of the obtained LSGM electrolyte sheet were measured as did in the Manufacturing Example 1. The results are shown in Table 2. None of the tips of the concaves observed in the roughness curve was acutely angled.

2-4. Manufacturing Example 4

The 6ScSZ green sheet obtained in the Manufacturing Example 1 was cut and fired at 1420° C. for 3 hours. A 10 cm×10 cm square 6ScSZ electrolyte sheet having a 160 μm of thickness was obtained. The surface of this electrolyte sheet was roughened by blasting. The flexural strength and the Weibull modulus of the obtained 6ScSZ electrolyte sheet were measured as did in the Manufacturing Example 1. The results are shown in Table 2. Although the surface of the obtained 6ScSZ electrolyte sheet was roughened by blasting, concaves were not formed. When the valley formed on the surface of the sheet by blasting was observed, the valley had an acutely angled tip.

[Table 2]

As shown in Table 2, the electrolyte sheets of the Manufacturing Examples 1-3 had 0.1 μm to 30 μm of the average distances between the peaks, and 0.05 μm to 20 μm of the average valley depth, determined from the roughness curves. In addition, the tips of the concaves observed in the roughness curves were not acutely angled. These electrolyte sheets had large flexural strengths and large Weibull moduluses. In contrast, the electrolyte sheet of the Manufacturing Example 4 had acutely angled tips in the valley observed in the roughness curve. This electrolyte sheet had a smaller flexural strength and a smaller Weibull modulus.

2-5. Manufacturing Examples 5-7

Except for changing the stamper, electrolyte sheets were produced as did in the Manufacturing Examples 1-3. The measured physical properties of the obtained electrolyte sheets are shown in Table 3.

[Table 3]

2-6. Manufacturing Example 8

Figure 9:
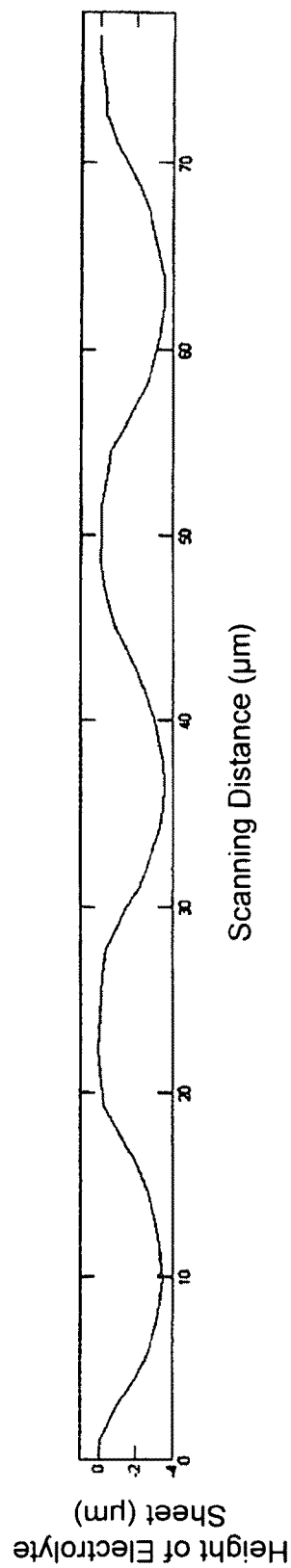
FIG. 9 is a concave-shape profile of an electrolyte sheet obtained in Manufacturing Example 8.
Figure 10:
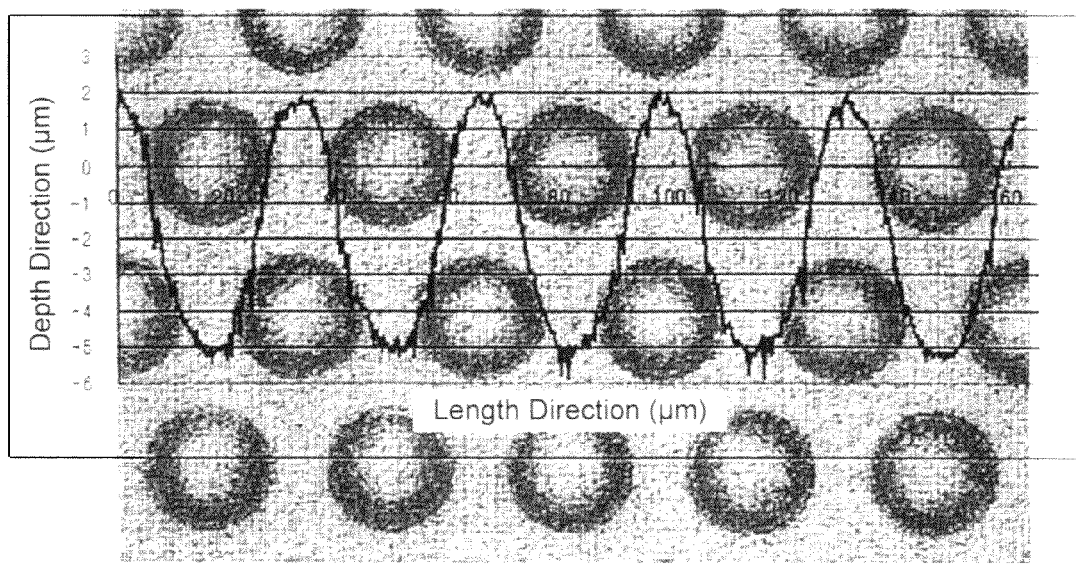
FIG. 10 is a diagram in which a photographic image of a surface of the electrolyte sheet obtained in Manufacturing Example 8 and the concave-shape profile of this electrolyte sheet are superimposed.
Figure 11:
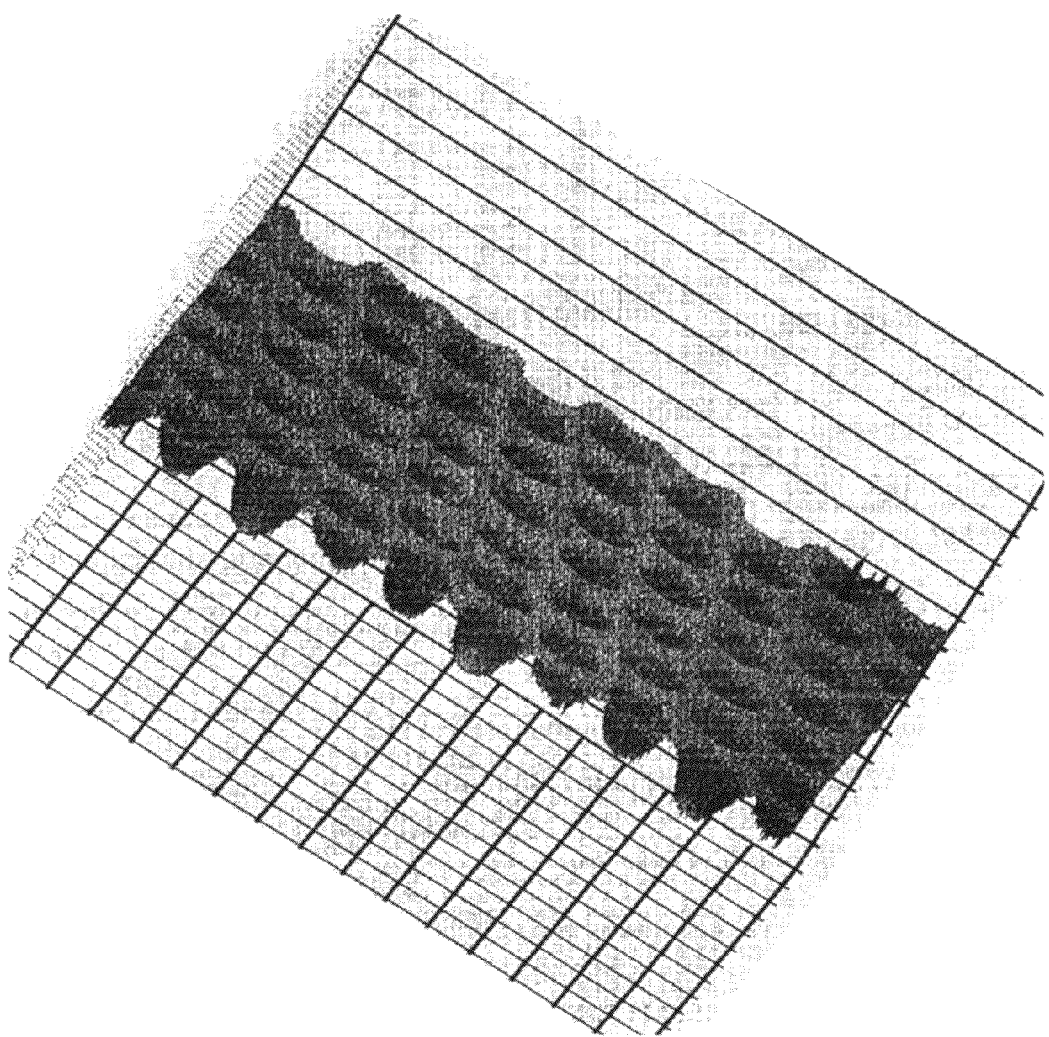
FIG. 11 is a perspective view showing a three-dimensional shape of the surface of the electrolyte sheet obtained in Manufacturing Example 8.

As did in the Manufacturing Example 1, a 6ScSZ green sheet was molded. This 6ScSZ green sheet was cut into approximately 12 cm×12 cm square, and sandwiched by stampers. This sandwich was mounted on a heating table, forming a stack (heating table/stamper/green sheet/stamper). The stack was mounted in a pressing unit of a compacting machine (Shinto Metal Industries Corporation, model 'S-37.5'), and pressurized in a condition shown in Table 4. The stamper was detached from the green sheet, and a 6ScSZ green sheet, on which concave holes were formed on both sides, was obtained. By firing this green sheet, a 10 cm×10 cm square 6ScSZ electrolyte sheet having a 160 μm of thickness was obtained. The physical properties of the 6ScSZ electrolyte sheet were measured and shown in Table 4. The concave profile of a part of a surface of the electrolyte sheet is shown in FIG. 9. The figure superposing a photographed image of the surface of the electrolyte sheet (corresponding to X-Y axis) and a profile data of the concave shapes (corresponding to Z axis) is shown in FIG. 10. And, a three-dimensional shape of the surface of the electrolyte sheet is shown in FIG. 11. All these figures were obtained by using a color 3D profile microscope. In FIG. 10, the photographed image and the profile of the concave shape were superposed so that the baseline of the profile of the concave shape aligned with the scanning position measured on the photographed image.

2-7. Manufacturing Example 9

As did in the Manufacturing Example 2, an 8YSZ green sheet was molded. Concaves were formed on both sides of this green sheet, as that of the Manufacturing Example 8, under the conditions shown in Table 4. Then, the 8YSZ green sheet was fired. The determined physical properties of the obtained 8YSZ electrolyte sheet are shown in Table 4.

2-8. Manufacturing Example 10

As did in the Manufacturing Example 3, an LSGM green sheet was molded. Concaves were formed on both sides of this green sheet, as that of the Manufacturing Example 8, under the conditions shown in Table 4. Then, the LSGM green sheet was fired. The determined physical properties of the obtained LSGM electrolyte sheet are shown in Table 4.

2-9. Manufacturing Example 11

A raw material slurry was prepared by putting the following mixture into a nylon pot: 100 mass parts of commercially available zirconia powder stabilized by scandium (Daiichi Kigenso Kagaku Kogyo Co., Ltd, product name '10Sc1CeSZ', specific surface area: 10.8 m$^2$/g, average particle diameter: 0.60 μm, hereafter abbreviated as 10Sc1CeSZ), 50 mass parts of toluene as solvent, 2 mass parts of sorbitan fatty acid ester surfactant as dispersing agent, 19 mass parts (solid basis) of binder made of methacrylate copolymer (number average molecular weight: 100,000, glass transition temperature: −8° C., solid concentration: 50 mass %), and 3 mass parts of dibutyl phthalate as plasticizer. The mixture was milled at 60 rpm for 20 hours, and the slurry was prepared. The slurry was transferred to a depressurizing defoaming container, and inside of the container was depressurized to be 3.99 kPa-21.3 kPa (30 Torr-160 Torr). Thereby, the slurry was concentrated and defoamed, resulting in a coating slurry having a viscosity of 3 Pa·s.

The obtained coating slurry was coated on a PET film by doctor blade. The coated PET film was passed through a drying oven, which has three degrees of temperatures 50° C., 80° C. and 110° C., at a 0.2 m/min of speed. Thereby, an about 280 μm-thick 10Sc1CeSZ green sheet was formed. Then, concaves were formed on both sides of this green sheet, as did in the Manufacturing Example 8, under the conditions shown in Table 4. Then, the 10Sc1CeSZ green sheet was fired. The determined physical properties of the obtained 10Sc1CeSZ electrolyte sheet are shown in Table 4.

2-10. Manufacturing Example 12

The 6ScSZ green sheet obtained in the Manufacturing Example 1 was cut and fired. A 10 cm×10 cm square 6ScSZ electrolyte sheet having a 160 μm of thickness was obtained. Both the surfaces of this electrolyte sheet were roughened by blasting. The determined physical properties of the roughed electrolyte sheet are shown in Table 4.

2-11. Manufacturing Example 13

The 10Sc1CeSZ green sheet obtained in the Manufacturing Example 11 was cut and fired. A 10 cm×10 cm square 10Sc1CeSZ electrolyte sheet having a 210 μm of thickness was obtained. Both the surfaces of this electrolyte sheet were roughened by blasting. The determined physical properties of the roughed electrolyte sheet are shown in Table 4.

2-12. Manufacturing Example 14

After the 10Sc1CeSZ green sheet obtained in the Manufacturing Example 11 was cut, concaves were formed on both sides of this green sheet, as did in the Manufacturing Example 8, under the conditions shown in Table 4. Then, the 10Sc1CeSZ green sheet was fired. The depth of the concave of the 10Sc1CeSZ electrolyte sheet obtained was larger than 50 μm. The determined physical properties of the obtained 10Sc1CeSZ electrolyte sheet are shown in Table 4.

[Table 4]

As shown in Tables 3 & 4, the electrolyte sheets of the Manufacturing Examples 5-11 had large flexural strengths and large Weibull moduluses. In contrast, the electrolyte sheets of the Manufacturing Examples 12, 13 and 14 had smaller flexural strengths and smaller Weibull moduluses.

2-13. Manufacturing Examples 15-18

Figure 12:
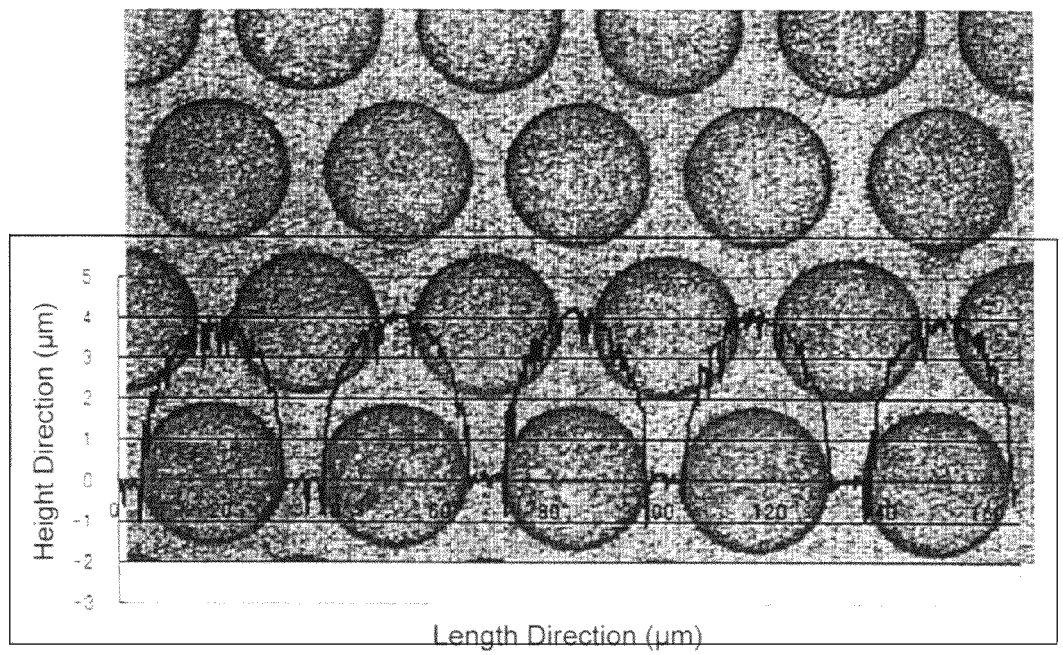
FIG. 12 is a diagram in which a photographic image of a surface of an electrolyte sheet obtained in Manufacturing Example 15 and a convex-shape profile of this electrolyte sheet are superimposed.
Figure 13:
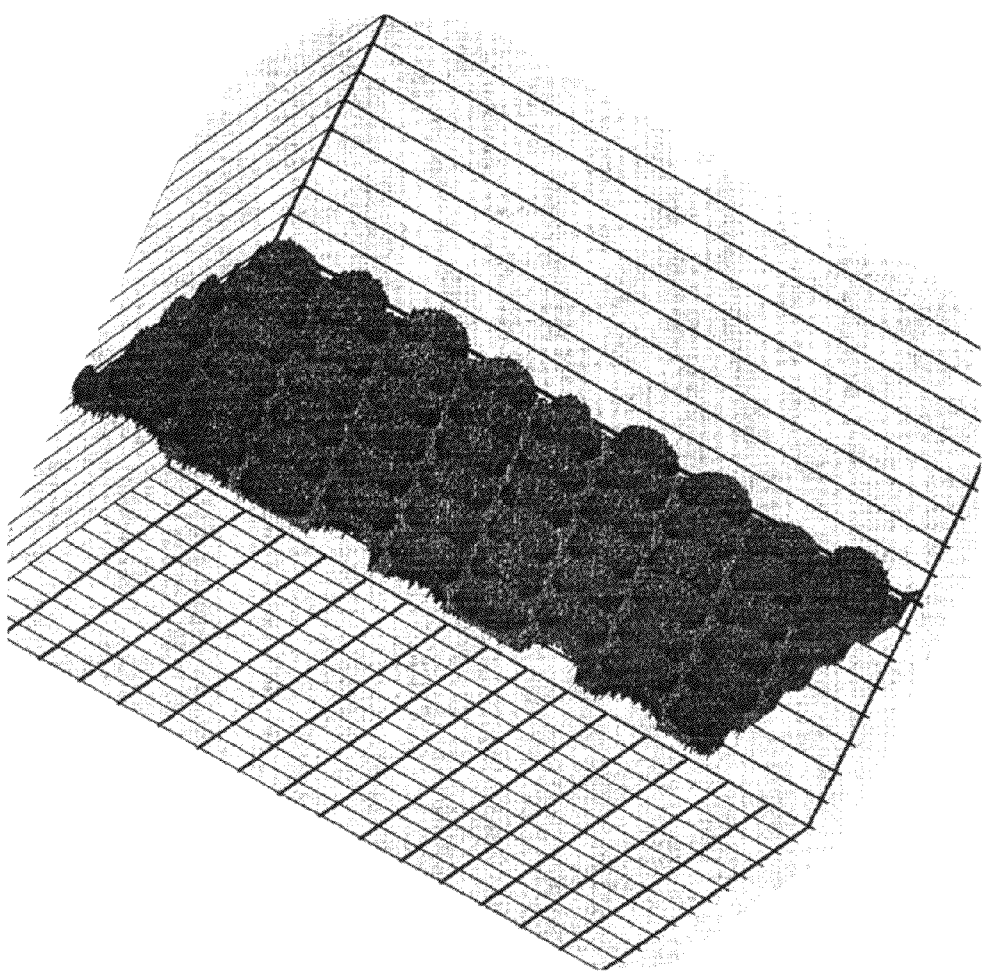
FIG. 13 is a perspective view showing a three-dimensional shape of a surface of an electrolyte sheet obtained in Manufacturing Example 15.

Except for changing the stampers, electrolyte sheets were produced as in the case of Manufacturing Examples 8-11. The measured physical properties of the obtained electrolyte sheets are shown in Table 5. The figure superposing a photographed image of the surface of the electrolyte sheet (corresponding to X-Y axis) and a profile data of the convex shapes (corresponding to Z axis) is shown in FIG. 12. And, a three-dimensional shape of the surface of the electrolyte sheet is shown in FIG. 13. Both the figures were obtained by using a color 3D profile microscope. In FIG. 12, the photographed image and the profile of the convex shape were superposed so that the baseline of the profile of the convex shape was aligned with the scanning position measured on the photographed image.

[Table 5]

As shown in Table 5, the electrolyte sheets of the Manufacturing Examples 15-18 had large flexural strengths and large Weibull moduluses. In contrast, the electrolyte sheets of the Manufacturing Examples 12 and 13 had smaller flexural strengths and smaller Weibull moduluses.

3. Manufacture of Solid Oxide Fuel Cell 3-1. Single Cell No. 1

As did in the Manufacturing Example 1, a 6ScSZ electrolyte sheet having 30 mm φ was produced. Then, a cell for fuel cell was produced, using this electrolyte sheet. In detail, materials of a fuel electrode were applied on one side of the 30 mm φ electrolyte sheet by screen printing. The materials were composed of nickel oxide particles, ceria particles doped with 20 mol % of gadolinium (hereafter abbreviated as 20GDC), and scandia ceria-stabilized zirconia particles (Daiichi Kigenso Kagaku Kogyo Co., Ltd, hereafter abbreviated as 10Sc1CeSZ). A material of an intermediate layer was applied on the opposite side of the electrolyte sheet by screen printing. The material of the intermediate layer was composed of the 20GDC. The electrolyte sheet was baked at 1300° C. Next, materials of an air electrode were applied on the 20GDC intermediate layer by screen printing. The materials of the air electrode were composed of $La_{0.6}Sr_{0.4}Cu_{0.2}Fe_{0.8}O_3$ particles (hereafter abbreviated as LSCF6428) and 10Sc1CeSZ. The electrolyte sheet was baked at 950° C. Thereby, a single cell No. 1 having a four-layered structure was obtained. The power generation performance and flexural strength of the obtained single cell No. 1 were measured. The results are shown in Table 6.

3-2. Single Cells Nos. 2-6

As did in the Manufacturing Examples 4, 8 and 11-13, electrolyte sheets having 30 mm φ were produced. By the same method of the section '3-1. Single Cell No. 1', single cells Nos. 2-6 having four-layered structures were obtained. The power generation performances and flexural strengths of these single cells were measured. The results are shown in Table 6.

[Table 6]

As shown in Tables 6, in comparison with the electrolyte sheet obtained in the Manufacturing Example 1 having concaves and the electrolyte sheet obtained in the Manufacturing Example 4 lacking concaves, the cell using the electrolyte sheet of the Manufacturing Example 1 had a larger power generation and a larger flexural strength of the cell than those of the Manufacturing Example 4. Likewise, the cells using the electrolyte sheets of the Manufacturing Examples 8 and 11 had larger power generations and larger flexural strengths of the cells than those of the Manufacturing Examples 12 and 13.

Industrial Applicability

The present invention relates to an electrolyte sheet for solid oxide fuel cell, and a method of producing the same, and a cell for solid oxide fuel cell having the electrolyte sheet. The electrolyte sheet has a specific surface shape, surface roughness and so on, resulting in superior strength characteristics. The fuel cell having the electrolyte sheet has a superior power generation performance.

Explanation of Numbers

1. Substrate
2: Pressing Part
3: Convex
4: Stamper
5: Electrolyte Green Sheet
6: Heating table
7: Heater
8: Electrolyte Sheet
A-I, a-i: Measuring Locations

TABLE 1

| Stamper No. | 1 | 2 | 3 | 4 | 5 | 6 | 7 | 8 | 9 |
|---|---|---|---|---|---|---|---|---|---|
| Material | Ni alloy | Ni alloy | Ni alloy | Ni alloy | Ni alloy | Ni alloy | Ni alloy | Ni alloy | Ni alloy |
| Shape of Basal Plane of Convex or Concave | Circular | Circular | Circular | Circular | Circular | Circular | Circular | Circular | Circular |
| Three-Dimensional Shape of | Hemi- | Hemi- | Hemi- | Hemi- | Hemi- | Hemi- | Hemi- | Hemi- | Hemi- |

TABLE 1-continued

| Stamper No. | | 1 | 2 | 3 | 4 | 5 | 6 | 7 | 8 | 9 |
|---|---|---|---|---|---|---|---|---|---|---|
| Convex or Concave | | spherical | spherical | spherical | spherical | spherical | spherical | spherical | spherical | spherical |
| Diameter of Convex | (μm) | 30 | 60 | 20 | 110 | | | | | 500 |
| Height of Convex | (μm) | 15 | 30 | 10 | 50 | | | | | 250 |
| Diameter of Concave | (μm) | | | | | 30 | 60 | 20 | 110 | |
| Depth of Concave | (μm) | | | | | 15 | 30 | 10 | 50 | |
| Gap between Peaks or Bottoms of Adjacent Convexes or Concaves | (μm) | 40 | 80 | 30 | 120 | 40 | 80 | 30 | 120 | 600 |
| Arrangement of Convexes | | Houndstooth | Houndstooth | Houndstooth | Houndstooth | Houndstooth | Houndstooth | Houndstooth | Houndstooth | Houndstooth |

TABLE 2

| | | | Manufacturing Example 1 | Manufacturing Example 2 | Manufacturing Example 3 | Manufacturing Example 4 |
|---|---|---|---|---|---|---|
| Properties of Electrolyte Sheet | Material of Electrolyte Sheet | | 6ScSz | 8YSZ | LSGM | 6ScSz |
| | Average Distance between Peaks | (μm) | 8.2 | 1.8 | 3.4 | — |
| | Average Depth of Valley | (μm) | 4.4 | 1.2 | 1.5 | — |
| | Flexural Strength | (MPa) | 570 | 360 | 410 | 350 |
| | Weibull Modulus | | 11.7 | 11.9 | 10.8 | 9.6 |

TABLE 3

| | | | Manufacturing Example 5 | Manufacturing Example 6 | Manufacturing Example 7 |
|---|---|---|---|---|---|
| Stamper No. | | | 1 | 2 | 3 |
| Properties of Green Sheet (23° C.) | Tensile Yield Strength | (MPa) | 13.9 | 13.0 | 11.5 |
| | Elongation at Break | (%) | 15 | 18 | 25 |
| Pressing Conditions | Pressing Temperature | (° C.) | 25 | 40 | 45 |
| | Pressing Time | (sec) | 2 | 30 | 10 |
| | Pressing Pressure | (MPa) | 22.5 | 11.8 | 5.88 |
| Firing Conditions | Firing Temperature | (° C.) | 1400 | 1450 | 1480 |
| | Firing Time | (hr) | 3 | 3 | 3 |
| Properties of Electrolyte Sheet | Material of Electrolyte Sheet | | 6ScSZ | 8YSZ | LSGM |
| | Sheet Thickness | (μm) | 160 | 220 | 250 |
| | Shape of Basal Plain of Concave | | Front Side Circular | Front Side Circular | Front Side Circular |
| | Three-Dimensional Shape of Concave | | Hemispherical | Hemispherical | Hemispherical |
| | Average Circle-Equivalent Diameter of Concave | (μm) | 20 | 55 | 18 |
| | Average Depth of Concave | (μm) | 4.5 | 8 | 4 |
| | Flexural Strength | (MPa) | 570 | 360 | 410 |
| | Weibull Modulus | | 11.7 | 11.9 | 10.8 |

TABLE 4

| | | | Manufacturing Example 8 | | Manufacturing Example 9 | | Manufacturing Example 10 | | Manufacturing Example 11 | |
|---|---|---|---|---|---|---|---|---|---|---|
| Stamper No. | | | 1 | | 2 | | 3 | | 4 | |
| Properties of Green Sheet (23° C.) | Tensile Yield Strength | (MPa) | 13.9 | | 13.0 | | 11.5 | | 8.0 | |
| | Elongation at Break | (%) | 15 | | 18 | | 25 | | 20 | |
| Pressing Conditions | Pressing Temperature | (° C.) | 25 | | 40 | | 45 | | 25 | |
| | Pressing Time | (sec) | 2 | | 30 | | 10 | | 5 | |
| | Pressing Pressure | (MPa) | 22.5 | | 11.8 | | 5.88 | | 42.5 | |
| Firing Conditions | Firing Temperature | (° C.) | 1400 | | 1450 | | 1480 | | 1400 | |
| | Firing Time | (hr) | 3 | | 3 | | 3 | | 3 | |
| Properties of Electrolyte Sheet | Material of Electrolyte Sheet | | 6ScSZ | | 8YSZ | | LSGM | | 10Sc1CeSZ | |
| | Sheet Thickness | (μm) | 160 | | 220 | | 250 | | 210 | |
| | | | Front Side | Back Side | Front Side | Back Side | Front Side | Back Side | Front Side | Back Side |

TABLE 4-continued

| | | | | | | | | | | |
|---|---|---|---|---|---|---|---|---|---|---|
| Shape of Basal Plane of Concave | | Circular | Circular | Circular | Circular | Circular | Circular | Circular | Circular |
| Three-Dimensional Shape of Concave | | Hemi-spherical | Hemi-spherical | Hemi-spherical | Hemi-spherical | Hemi-spherical | Hemi-spherical | Hemi spherical | Hemi-spherical |
| Average Circle Equivalent Diameter of Concave | (μm) | 18 | 19 | 50 | 52 | 17 | 19 | 90 | 100 |
| Average Depth of Concave | (μm) | 3.5 | 4 | 7 | 7.5 | 3 | 3.5 | 22 | 24 |
| Coefficient of Variance of Depth of Concave | | 0.15 | 0.18 | 0.20 | 0.21 | 0.22 | 0.22 | 0.16 | 0.18 |
| Coefficient of Variance of Circle-Equivalent Diameters of Concave | | 0.17 | 0.20 | 0.21 | 0.21 | 0.18 | 0.19 | 0.20 | 0.20 |
| Ratio of Average Depth to Average Circle-Equivalent Diameter | | 0.19 | 0.21 | 0.14 | 0.14 | 0.18 | 0.18 | 0.24 | 0.24 |
| Average Depth of Concave over Sheet Thickness | (%) | 2.2% | 2.5% | 3.2% | 3.4% | 1.2% | 1.4% | 10.5% | 11.4% |
| Flexural Strength | (MPa) | 600 | | 380 | | 420 | | 560 | |
| Weibull Modulus | | 12.0 | | 11.7 | | 10.3 | | 10.9 | |

| | | | Manufacturing Example 12 | | Manufacturing Example 13 | | Manufacturing Example 14 | |
|---|---|---|---|---|---|---|---|---|
| | Stamper No. | | — | | — | | 9 | |
| Properties of Green Sheet (23° C.) | Tensile Yield Strength | (MPa) | 13.9 | | 8.0 | | 8.0 | |
| | Elongation at Break | (%) | 15 | | 20 | | 20 | |
| Pressing Conditions | Pressing Temperature | (° C.) | | | | | 25 | |
| | Pressing Time | (sec) | | | | | 5 | |
| | Pressing Pressure | (MPa) | | | | | 42.5 | |
| Firing Conditions | Firing Temperature | (° C.) | 1400 | | 1400 | | 1400 | |
| | Firing Time | (hr) | 3 | | 3 | | 3 | |
| Properties of Electrolyte Sheet | Material of Electrolyte Sheet | | 6ScSZ | | 10Sc1CeSZ | | 10Sc1CeSZ | |
| | Sheet Thickness | (μm) | 160 | | 210 | | 210 | |
| | | | Front Side | Back Side | Front Side | Back Side | Front Side | Back Side |
| | Shape of Basal Plane of Concave | | — | — | — | — | Circular | Circular |
| | Three-Dimensional Shape of Concave | | | | | | Hemi-spherical | Hemi-spherical |
| | Average Circle Equivalent Diameter of Concave | (μm) | | | | | 210 | 220 |
| | Average Depth of Concave | (μm) | | | | | 51 | 55 |
| | Coefficient of Variance of Depth of Concave | | | | | | 0.23 | 0.24 |
| | Coefficient of Variance of Circle-Equivalent Diameters of Concave | | | | | | 0.21 | 0.22 |
| | Ratio of Average Depth to Average Circle-Equivalent Diameter | | | | | | 0.24 | 0.25 |
| | Average Depth of Concave over Sheet Thickness | (%) | | | | | 24.3% | 25.0% |
| | Flexural Strength | (MPa) | 350 | | 300 | | 350 | |
| | Weibull Modulus | | 9.6 | | 8.0 | | 9.1 | |

TABLE 5

| | | | Manufacturing Example 15 | | Manufacturing Example 16 | | Manufacturing Example 17 | |
|---|---|---|---|---|---|---|---|---|
| Stamper No. | | | 5 | | 6 | | 7 | |
| | Tensile Yield Strength | (MPa) | 13.9 | | 13.0 | | 11.5 | |
| | Elongation at Break | (%) | 15 | | 18 | | 25 | |
| | Pressing Temperature | (° C.) | 25 | | 40 | | 45 | |
| | Pressing Time | (sec) | 5 | | 30 | | 10 | |
| | Pressing Pressure | (MPa) | 22.5 | | 25 | | 12.5 | |
| | Firing Temperature | (° C.) | 1400 | | 1450 | | 1480 | |
| | Firing Time | (hr) | 3 | | 3 | | 3 | |
| | Material of Electrolyte Sheet | | 6ScSZ | | 8YSZ | | LSGM | |
| | Sheet Thickness | (μm) | 160 | | 220 | | 250 | |
| | | | Front Side | Back Side | Front Side | Back Side | Front Side | Back Side |
| | Shape of Basal Plane of Convex | | Circular | Circular | Circular | Circular | Circular | Circular |
| | Three-Dimensional Shape of Convex | | Hemi-spherical | Hemi-spherical | Hemi-spherical | Hemi-spherical | Hemi-spherical | Hemi-spherical |

TABLE 5-continued

|  |  |  |  |  |  |  |  |
|---|---|---|---|---|---|---|---|
| Average Circle Equivalent Diameter of Convex | (µm) | 19 | 19 | 52 | 52 | 17 | 19 |
| Average Height of Convex | (µm) | 1.8 | 2 | 3 | 3.5 | 2.8 | 3 |
| Coefficient of Variance of Height of Convex |  | 0.15 | 0.17 | 0.20 | 0.19 | 0.21 | 0.20 |
| Coefficient of Variance of Circle-Equivalent Diameters of Convex |  | 0.16 | 0.18 | 0.20 | 0.17 | 0.17 | 0.19 |
| Ratio of Average Height to Average Circle-Equivalent Diameter |  | 0.09 | 0.11 | 0.06 | 0.07 | 0.16 | 0.16 |
| Average Height of Convex over Sheet Thickness | (%) | 1.1% | 1.3% | 1.4% | 1.6% | 1.1% | 1.2% |
| Flexural Strength | (MPa) | 550 | | 410 | | 400 | |
| Weibull Modulus |  | 11.2 | | 11.0 | | 10.1 | |

| | | | Manufacturing Example 18 | | Manufacturing Example 12 | | Manufacturing Example 13 | |
|---|---|---|---|---|---|---|---|---|
| Stamper No. | | | 8 | | — | | — | |
| Properties of Green Sheet (23° C.) | Tensile Yield Strength | (MPa) | 8.0 | | 13.9 | | 8.0 | |
| | Elongation at Break | (%) | 20 | | 15 | | 20 | |
| Pressing Conditions | Pressing Temperature | (° C.) | 25 | | | | | |
| | Pressing Time | (sec) | 5 | | | | | |
| | Pressing Pressure | (MPa) | 55.5 | | | | | |
| Firing Conditions | Firing Temperature | (° C.) | 1400 | | 1400 | | 1400 | |
| | Firing Time | (hr) | 3 | | 3 | | 3 | |
| Properties of Electrolyte Sheet | Material of Electrolyte Sheet | | 10Sc1CeSZ | | 6ScSZ | | 10Sc1CeSZ | |
| | Sheet Thickness | (µm) | 210 | | 160 | | 210 | |
| | | | Front Side | Back Side | Front Side | Back Side | Front Side | Back Side |
| | Shape of Basal Plane of Convex | | Circular | Circular | — | — | — | — |
| | Three-Dimensional Shape of Convex | | Hemi-spherical | Hemi-spherical | | | | |
| | Average Circle Equivalent Diameter of Convex | (µm) | 90 | 100 | | | | |
| | Average Height of Convex | (µm) | 12 | 14 | | | | |
| | Coefficient of Variance of Height of Convex | | 0.15 | 0.18 | | | | |
| | Coefficient of Variance of Circle-Equivalent Diameters of Convex | | 0.17 | 0.16 | | | | |
| | Ratio of Average Height to Average Circle-Equivalent Diameter | | 0.13 | 0.14 | | | | |
| | Average Height of Convex over Sheet Thickness | (%) | 5.7% | 6.7% | | | | |
| | Flexural Strength | (MPa) | 500 | | 350 | | 300 | |
| | Weibull Modulus | | 10.4 | | 9.6 | | 8.0 | |

TABLE 6

| Single Cell No. | Electrolyte Sheet Used | Voltage (V) at Current Density 0.3 A/cm² | Flexural Strength (MPa) |
|---|---|---|---|
| 1 | Manufacturing Example 1 | 0.8 | 520 |
| 2 | Manufacturing Example 4 | 0.79 | 230 |
| 3 | Manufacturing Example 8 | 0.81 | 540 |
| 4 | Manufacturing Example 11 | 0.82 | 480 |
| 5 | Manufacturing Example 12 | 0.79 | 230 |
| 6 | Manufacturing Example 13 | 0.77 | 200 |

The invention claimed is:

1. An electrolyte sheet for solid oxide fuel cell comprising: a plurality of concaves and/or convexes at least on one side of the electrolyte sheet, wherein plan-viewed shapes of the concaves or the convexes are approximately circular, elliptical, or polygonal with polygon's corners rounded and with polygon's corners having an at least 0.1 µm of curvature radius, and/or three-dimensional shapes of the concaves or the convexes are approximately hemispherical, hemi-ellipsoidal, or polyhedral with polyhedron's ridges or corners having curves of an at least 0.1 µm of curvature radius in cross-sectional views of the concaves or the convexes, wherein an average circle-equivalent diameter of the plan-viewed shapes of the concaves or the convexes is at least 0.5 µm and at most 250 µm, wherein an average depth of the concaves or an average height of the convexes is at least 0.3 µm and at most 50 µm, and wherein an average thickness of the electrolyte sheet is at least 100 µm and at most 400µm.

2. The electrolyte sheet of claim 1, wherein the average depth of the concaves or the average height of the convexes on one side of the sheet is at least 1% and at most 33% of the average thickness of the electrolyte sheet.

3. The electrolyte sheet of claim 1, further comprising at least one element selected from the group consisting of zirconium, cerium, lanthanum and gallium.

4. The electrolyte sheet of claim 1, wherein a coefficient of variance of the depths of the concaves (a standard deviation of the depths of the concaves/the average depth of the concaves) or a coefficient of variance of the heights of the convexes (a standard deviation of the heights of the convexes/the average height of the convexes) is at most 0.25.

5. The electrolyte sheet of claim 1, wherein a coefficient of variance of the circle-equivalent diameters of the plan-viewed shapes of the concaves or the convexes (a standard deviation of the circle-equivalent diameters of the plan-viewed shapes of the concaves or the convexes/the average circle-equivalent diameter of the plan-viewed shapes of the concaves or the convexes) is at most 0.25.

6. The electrolyte sheet of claim 1, wherein a ratio of the average depth of the concaves to the average circle-equivalent diameter of the plan-viewed shapes of the concaves (the average depth of the concaves/the average circle-equivalent diameter of the plan-viewed shapes of the concaves) or a ratio of the average height of the convexes to the average circle-equivalent diameter of the plan-viewed shapes of the convexes (the average height of the convexes/the average circle-equivalent diameter of the plan-viewed shapes of the convexes) is at least 0.05 and at most 0.5.

7. The electrolyte sheet of claim 1, wherein a difference between the average circle-equivalent diameter of the plan-viewed shapes of the concaves or the convexes and an average gap between bottoms of two of the adjacent concaves or an average gap between tops of two of the adjacent convexes is at least 0.1 μm and at most 30 μm.

8. The electrolyte sheet of claim 1, wherein bottoms of the concaves or tops of the convexes lack acutely angled shapes.

9. The electrolyte sheet of claim 1, wherein boundaries between the concaves or the convexes and a surface of the electrolyte sheet are formed of curves.

10. The electrolyte sheet of claim 1, wherein the electrolyte sheet has a curve on a surface of the electrolyte sheet between two of the adjacent concaves or between two of the adjacent convexes in a vertical cross-sectional view of the electrolyte sheet, and
wherein a highest point of the surface of the electrolyte sheet is located on the curve between two of the adjacent concaves or a lowest point of the surface of the electrolyte sheet is located on the curve between two of the adjacent convexes in the vertical cross-sectional view of the electrolyte sheet.

11. The electrolyte sheet of claim 1, wherein a surface profile of the electrolyte sheet has an approximately sine curve when the surface of the electrolyte sheet is scanned by a depth-measuring microscope so that a scanning direction is selected to pass the concaves or the convexes and an X-axis of the surface profile is defined as a horizontal direction of the electrolyte sheet and a Y-axis of the surface profile is defined as a vertical direction of the electrolyte sheet.

12. The electrolyte sheet of claim 1, further comprising a plurality of impressions of a stamper on at least one side of the electrolyte sheet, each of the impressions constituting at least a part of the concave or the convex.

13. A method of producing an electrolyte sheet for solid oxide fuel cell, the method comprising the step of:
pressing one side or both sides of an electrolyte green sheet with a stamper comprising a plurality of convexes and/or concaves,
wherein plan-viewed shapes of the convexes or the concaves are approximately circular, elliptical, or polygonal with polygon's corners rounded and with polygon's corners having an at least 0.1 μm of curvature radius, and/or three-dimensional shapes of the convexes or the concaves are approximately hemispherical, hemi-ellipsoidal, or polyhedral with polyhedron's ridges or corners having curves of an at least 0.1 μm of curvature radius in cross-sectional views of the convexes or the concaves,
wherein circle-equivalent diameters of the plan-viewed shapes of the convexes or the concaves are at least 0.8 μm and at most 380 μm, and
wherein heights of the convexes or depths of the concaves are at least 1.1 μm and at most 186 μm.

14. The method of claim 13, wherein a maximum stress of the electrolyte green sheet is at least 1.96 MPa and at most 19.6 MPa at a temperature of pressing the stamper, and
wherein an elongation at maximum stress of the electrolyte green sheet is at least 20% and at most 500% at a temperature of pressing the stamper.

15. The method of claim 13, further comprising the step of:
forming the electrolyte green sheet from a slurry, before pressing the one side or the both sides of the electrolyte green sheet with the stamper,
wherein the slurry comprises at least one electrolyte selected from the group consisting of zirconia, ceria and lanthanum gallate oxide.

16. The method of claim 13, further comprising the step of:
forming the electrolyte green sheet from a slurry, before pressing the one side or the both sides of the electrolyte green sheet with the stamper,
wherein the slurry comprises at least 12 and at most 30 mass parts of an organic binder for 100 mass parts of an electrolyte.

17. The method of claim 13, wherein the stamper comprises the plurality of convexes, and
wherein the one side or the both sides of the electrolyte green sheet are pressed by the stamper with an at least 1.96 MPa and at most 49.0 MPa of pressing pressure so that the convexes touch a surface of the electrolyte green sheet and so that there is a gap between the surface of the electrolyte green sheet and a portion of a surface of the stamper, the portion of the surface being located between two of the adjacent convexes.

18. A stamper for forming concaves and/or convexes on an electrolyte green sheet comprising:
a plurality of convexes and/or concaves at least on one side of the stamper,
wherein plan-viewed shapes of the convexes or the concaves are approximately circular, elliptical, or polygonal with polygon's corners rounded and with polygon's corners having an at least 0.1 μm of curvature radius, and/or three-dimensional shapes of the convexes or the concaves are approximately hemispherical, hemi-ellipsoidal, or polyhedral with polyhedron's ridges or corners having curves of an at least 0.1 μm of curvature radius in cross-sectional views of the convexes or the concaves,
wherein circle-equivalent diameters of the plan-viewed shapes of the convexes or the concaves are at least 0.8 μ.m and at most 380 μm, and
wherein heights of the convexes or depths of the concaves are at least 1.1 μm and at most 186 μm.

19. A cell for solid oxide fuel cell comprising the electrolyte sheet of claim 1.

20. The cell for solid oxide fuel cell of claim 19, further comprising the plurality of concaves formed on the electrolyte sheet; and
a fuel electrode and/or an air electrode directly provided on the electrolyte sheet, the fuel electrode and/or the air electrode comprising electrode particles,
wherein an average particle diameter of the electrode particles is at most $1/10$ of the average circle-equivalent diameter of the plan-viewed shapes of the concaves.

* * * * *